(12) United States Patent
Kato et al.

(10) Patent No.: US 11,325,505 B2
(45) Date of Patent: May 10, 2022

(54) SLIDING DEVICE

(71) Applicants: TOYOTA BOSHOKU KABUSHIKI KAISHA, Aichi (JP); TOYOTA JIDOSHA KABUSHIKI KAISHA, Aichi (JP)

(72) Inventors: Haruo Kato, Aichi (JP); Eiichiro Tsuji, Aichi (JP); Hiromitsu Suzuki, Aichi (JP); Masaharu Nakamura, Aichi (JP); Masanori Fukuoka, Aichi (JP); Tomoya Takeuchi, Aichi (JP)

(73) Assignees: TOYOTA BOSHOKU KABUSHIKI KAISHA, Aichi (JP); TOYOTA JIDOSHA KABUSHIKI KAISHA, Aichi (JP)

(*) Notice: Subject to any disclaimer, the term of this patent is extended or adjusted under 35 U.S.C. 154(b) by 148 days.

(21) Appl. No.: 16/667,162

(22) Filed: Oct. 29, 2019

(65) Prior Publication Data
US 2020/0139855 A1   May 7, 2020

(30) Foreign Application Priority Data

Nov. 2, 2018   (JP) .............................. JP2018-207523

(51) Int. Cl.
*B60N 2/08* (2006.01)
(52) U.S. Cl.
CPC ................................... *B60N 2/085* (2013.01)
(58) Field of Classification Search
CPC ...... B60N 2/0725; B60N 2/08; B60N 2/0715; B60N 2/0705; B60N 2/067; B60N 2/0722; B60N 2/07; B60N 2/085
See application file for complete search history.

(56) References Cited

U.S. PATENT DOCUMENTS 5,188,329 A * 2/1993 Takahara ............. B60N 2/0705
                                                          248/345.1
8,393,590 B2   3/2013 Kato et al.
(Continued)

FOREIGN PATENT DOCUMENTS

CN   101801717 A   8/2010
DE   102014219171   4/2015
(Continued)

OTHER PUBLICATIONS

Chinese Office Action dated Sep. 29, 2020 in the related Chinese patent application No. 201811002021.1 and its English translation.
(Continued)

*Primary Examiner* — Kimberly T Wood
(74) *Attorney, Agent, or Firm* — Greenblum & Bernstein, P.L.C.

(57) ABSTRACT

A sliding device includes a fixed rail, a movable rail, a shutter to close an opening of the fixed rail, an engaging body including a pressed portion, an engaged portion, a resilient element, and a pressing portion provided to the movable rail or the shutter. The shutter is slidable relative to the fixed rail by receiving a force from the movable rail. The engaging body is provided to one of the shutter and the fixed rail, and the engaged portion is provided to the other. The engaging body is displaceable between an engaged position where it is engageable with the engaged portion and a disengaged position displaced from the engaged position. The resilient element produces a resilient force maintaining the engaging body in the engaged position. The pressing portion contacts with the pressed portion when the movable rail slides, thus displacing the engaging body to the disengaged position.

5 Claims, 21 Drawing Sheets

(56) References Cited

U.S. PATENT DOCUMENTS

| | | | | |
|---|---|---|---|---|
| 10,688,887 | B2* | 6/2020 | Tsuji | B60N 2/0725 |
| 2011/0233365 | A1 | 9/2011 | Kato et al. | |
| 2015/0090853 | A1 | 4/2015 | Arakawa | |
| 2015/0145298 | A1 | 5/2015 | Wottke et al. | |
| 2019/0061563 | A1 | 2/2019 | Tsuji et al. | |
| 2019/0061565 | A1 | 2/2019 | Tsuji et al. | |
| 2019/0061566 | A1 | 2/2019 | Tsuji et al. | |

FOREIGN PATENT DOCUMENTS

| | | |
|---|---|---|
| EP | 2876048 | 5/2015 |
| JP | H04109635 U | 9/1992 |
| JP | H06-027296 U | 4/1994 |
| JP | 2014233996 A | 12/2014 |
| JP | 2019043251 A | 3/2019 |

OTHER PUBLICATIONS

Chinese Office Action dated Sep. 29, 2020 in the related Chinese patent application No. 201811001010.1 and its English translation.
Notice of Reasons for Rejection dated Oct. 20, 2020 in the corresponding Japanese patent application No. 2018-207523 and its machine-generated English translation.
U.S. non-final Office Action dated May 30, 2019 in the related U.S. Appl. No. 16/048,764.
U.S. non-final Office Action dated May 30, 2019 in the related U.S. Appl. No. 16/048,706.
U.S. Final Office Action dated Nov. 8, 2019 in the related U.S. Appl. No. 16/048,706.
U.S. Final Office Action dated Jan. 15, 2020 in the related U.S. Appl. No. 16/048,764.
Notice of Allowance and Fee(s) Due dated Jan. 23, 2020 in the related U.S. Appl. No. 16/048,726.
Notice of Allowance and Fee(s) Due dated Jan. 24, 2020 in the related U.S. Appl. No. 16/048,706.
Notice of Allowance and Fee(s) Due dated Feb. 26, 2020 in the related U.S. Appl. No. 16/048,764.
Japanese Notice of Reasons for Rejection dated Apr. 21, 2020 in the corresponding Japanese patent application No. 2017-166227 and its English translation.
Japanese Notice of Reasons for Rejection dated Apr. 28, 2020 in the corresponding Japanese patent application No. 2017-166226 and its English translation.
Japanese Decision to Grant a Patent dated Apr. 28, 2020 in the corresponding Japanese patent application No. 2017-166225 and its English translation.
Office Action issued in German Counterpart Patent Appl. No. 102018214161.4, dated Oct. 10, 2019, along with an English translation thereof.
Office Action issued in German Counterpart Patent Appl. No. 102018214162.2, dated Oct. 10, 2019, along with an English translation thereof.
Chinese Office Action dated Oct. 8, 2021 issued in Chinese patent application No. 201911062970.3 and corresponding machine-generated English translation.
Chinese Office Action dated May 11, 2021 in the related Chinese patent application No. 201811001010.1 and a machine-generated English translation thereof.
German Office Action dated May 28, 2021 in the related German patent application No. 102018214162.2 and an English translation thereof.

* cited by examiner

SLIDING DEVICE

CROSS-REFERENCE TO RELATED APPLICATIONS

This application claims the benefit of Japanese Patent Application No. 2018-207523 filed on Nov. 2, 2018 with the Japan Patent Office, the disclosure of which is incorporated herein by reference.

BACKGROUND

The present disclosure relates to a sliding device supporting a seat body of a vehicle seat in a slidable manner.

For example, Japanese Unexamined Utility Model Application Publication No. H6-27296 (Patent Document 1) discloses a sliding device comprising an inner cover body and an outer cover body that slide in conjunction with an upper rail. The inner cover body and the outer cover body are shutters to cover the inside of a lower rail.

A longitudinal end of the upper rail and the outer cover body are coupled to each other with a coil spring. A protrusion provided to the upper rail is slidably fitted into an elongated hole arranged in the inner cover body.

In such a configuration, when the upper rail slides with respect to the lower rail, the inner cover body slides in conjunction with the sliding of the upper rail, and the outer cover body slides in conjunction with the sliding of the inner cover body.

SUMMARY

In the sliding device disclosed in Patent Document 1, it is difficult to reliably slide the outer cover body in conjunction with the sliding of the upper rail because the outer cover body slides in conjunction with the sliding of the inner cover body.

In view of the above-described point, the present disclosure discloses an example of a sliding device allowing for reliable sliding of members corresponding to the cover bodies.

A sliding device configured to support a seat body of a vehicle seat in a slidable manner according to one embodiment of the present disclosure comprises: a fixed rail configured to be fixed to a vehicle, the fixed rail comprising an opening opened upward, the opening being arranged in a longitudinal direction of the fixed rail; a movable rail to which the seat body is configured to be fixed, the movable rail being slidable with respect to the fixed rail; a shutter configured to close the opening, the shutter being slidable with respect to the fixed rail by receiving a force from the movable rail; an engaging body provided to either one of the shutter and the fixed rail, the engaging body being displaceable between an engaged position, in which the engaging body is engageable with an engaged portion provided to the other of the shutter and the fixed rail, and a disengaged position, in which the engaging body is displaced from the engaged position; a resilient element configured to produce a resilient force maintaining the engaging body in the engaged position; and a pressing portion provided to the movable rail or the shutter, the pressing portion contacting with a pressed portion provided to the engaging body when the movable rail slides, to thereby displace the engaging body to the disengaged position.

In the sliding device configured as above, when the movable rail is positioned within the fixed rail, the engaging body and the engaged portion engage with each other to thereby maintain the position of the shutter. When part of the movable rail is positioned outside the fixed rail, the engagement between the engaging body and the engaged portion is released by the sliding of the movable rail, and the shutter can slide integrally with the movable rail. Accordingly, the shutter can reliably slide together with the movable rail by receiving the force from the movable rail.

The above-described sliding device may have configurations to be described below.

It is desirable that the engaging body be provided to the shutter, that the engaged portion be provided to the fixed rail, and that the pressing portion be provided to the movable rail. This can inhibit the sliding device from having a complicated configuration.

It is desirable that the engaging body be displaced rotationally about a rotational axis substantially perpendicular to a sliding direction of the movable rail. This can inhibit the sliding device from having a complicated configuration.

It is desirable that the resilient element be configured with a coil spring; that a first end of the resilient element is coupled to the shutter; that a second end of the resilient element be coupled to the engaging body on an opposite side of the first end across a rotation center of the engaging body; and that, assuming that an imaginary line passing through the first end and the rotation center is a neutral line, that a position of the second end in the engaged position is a first position, and that a position of the second end in the disengaged position is a second position, the first position be on an opposite side of the second position across the neutral line.

This allows the engaging body to be maintained in the engaged position when the second end of the resilient element is in the first position. When the second end of the resilient element is in the second position, the engaging body is maintained in the disengaged position. Accordingly, the shutter operates stably and reliably.

It is desirable that the engaged portion have a columnar or cylindrical shape having a center axis substantially parallel to the rotational axis, and that the engaging body comprise a hook surrounding the engaged portion from three directions in the engaged position. Such a configuration inhibits the engaging body and the engaged portion from being easily disengaged even when an external force is applied to the engaging body.

It is desirable that the rotational axis be substantially parallel to a width direction of the seat body, and that, in the engaged position, the hook and the engaged portion be positioned below the rotational axis. Such a configuration inhibits the engaging body and the engaged portion from being easily disengaged even when a force directed upward from below is applied to the engaging body.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

Embodiments below show examples of embodiments of the present disclosure. Matters specifying the invention and so on recited in the appended claims are not limited by specific configurations, structures, and the like, shown in the embodiments below.

The number of a member or portion described below may be two or more unless accompanied by a specifying term, such as "only one".

The embodiments below are examples in which a seat of the present disclosure is applied to a seat to be mounted in a vehicle, such as an automobile (hereinafter referred to as a "vehicle seat"). Arrows and so on indicating directions shown in the figures are provided for the purpose of easier understanding of mutual relationships between the figures.

Thus, the present disclosure is not limited by the directions shown in the figures. The directions shown in the figures are based on a state in which the vehicle seat according to the embodiments below is mounted in the automobile.

First Embodiment

1. Overview of Vehicle Seat

Figure 1:
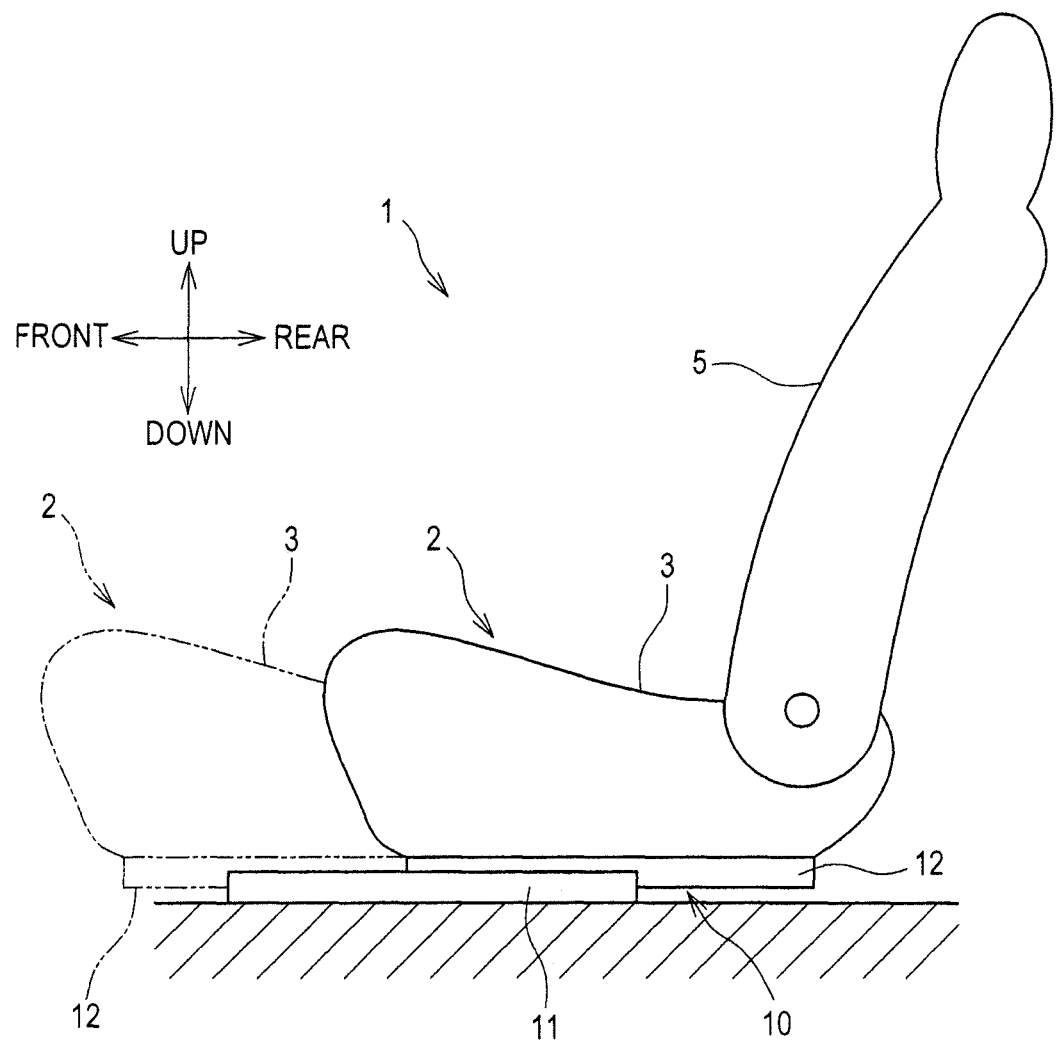
FIG. 1 is a diagram showing a vehicle seat according to a first embodiment.

In the present embodiment, a sliding device 10 of the present disclosure is applied to a vehicle seat 1 shown in FIG. 1. The vehicle seat 1 comprises at least a seat body 2 and a sliding device 10. The seat body 2 comprises a seat cushion 3 and a seatback 5.

The seat cushion 3 supports an occupant's buttocks. The seatback 5 supports the occupant's back. The sliding device 10 supports the seat body 2 in a slidable manner.

2. Sliding Device 2.1 Overview of Sliding Device

<Basic Configuration>

The seat body 2 is supported by two sliding devices 10. Of the two sliding devices 10, a first sliding device 10 is arranged on a seat-width-direction first side (e.g., on the right side). Of the two sliding devices 10, a second sliding device 10 is arranged on a seat-width-direction second side (e.g., on the left side).

The first sliding device 10 and the second sliding device 10 have substantially the same configuration. In the explanation below, the first sliding device 10 (hereinafter simply referred to as the sliding device 10) arranged on the seat-width-direction first side (the right side) will be described.

Figure 2:
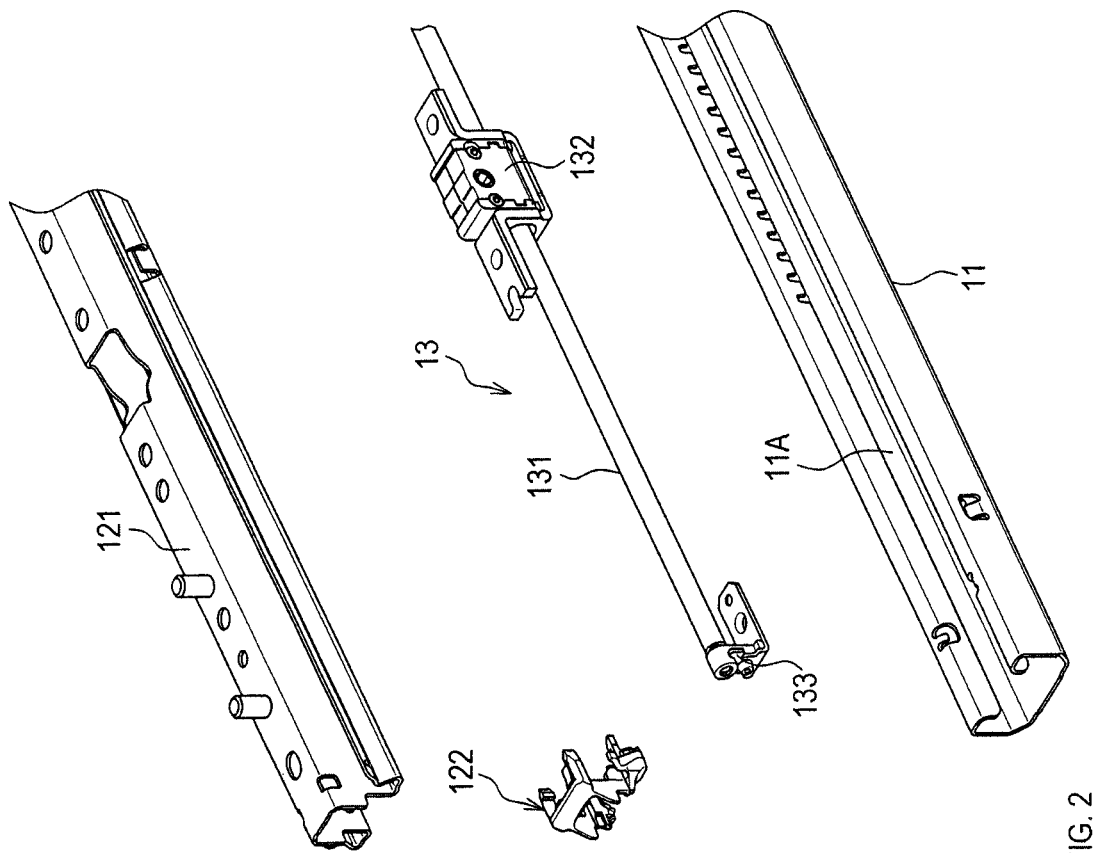
FIG. 2 is a diagram showing a sliding device according to the first embodiment.
Figure 2:
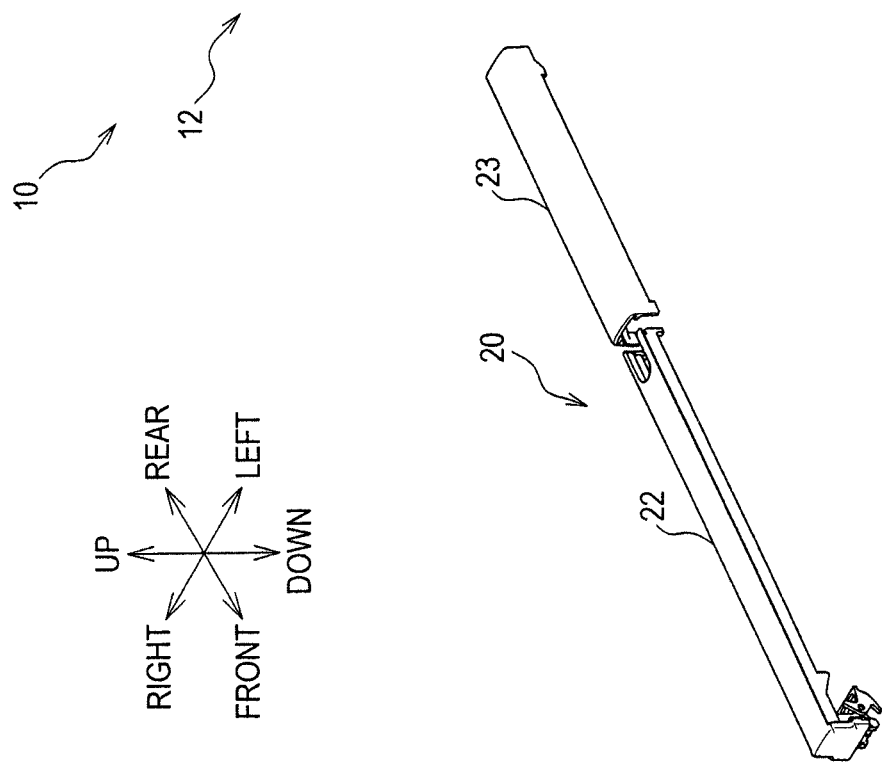

As shown in FIG. 2, the sliding device 10 comprises at least a fixed rail 11, a movable rail 12, a first shutter mechanism 20, and a second shutter mechanism (not shown). The fixed rail 11 is a metal member fixed directly or indirectly to a vehicle.

A longitudinal direction of the fixed rail 11 of the present embodiment corresponds to front-rear directions of the vehicle (automobile). The fixed rail 11 comprises an opening 11A opened upward, which is arranged in the longitudinal direction.

Figure 3:
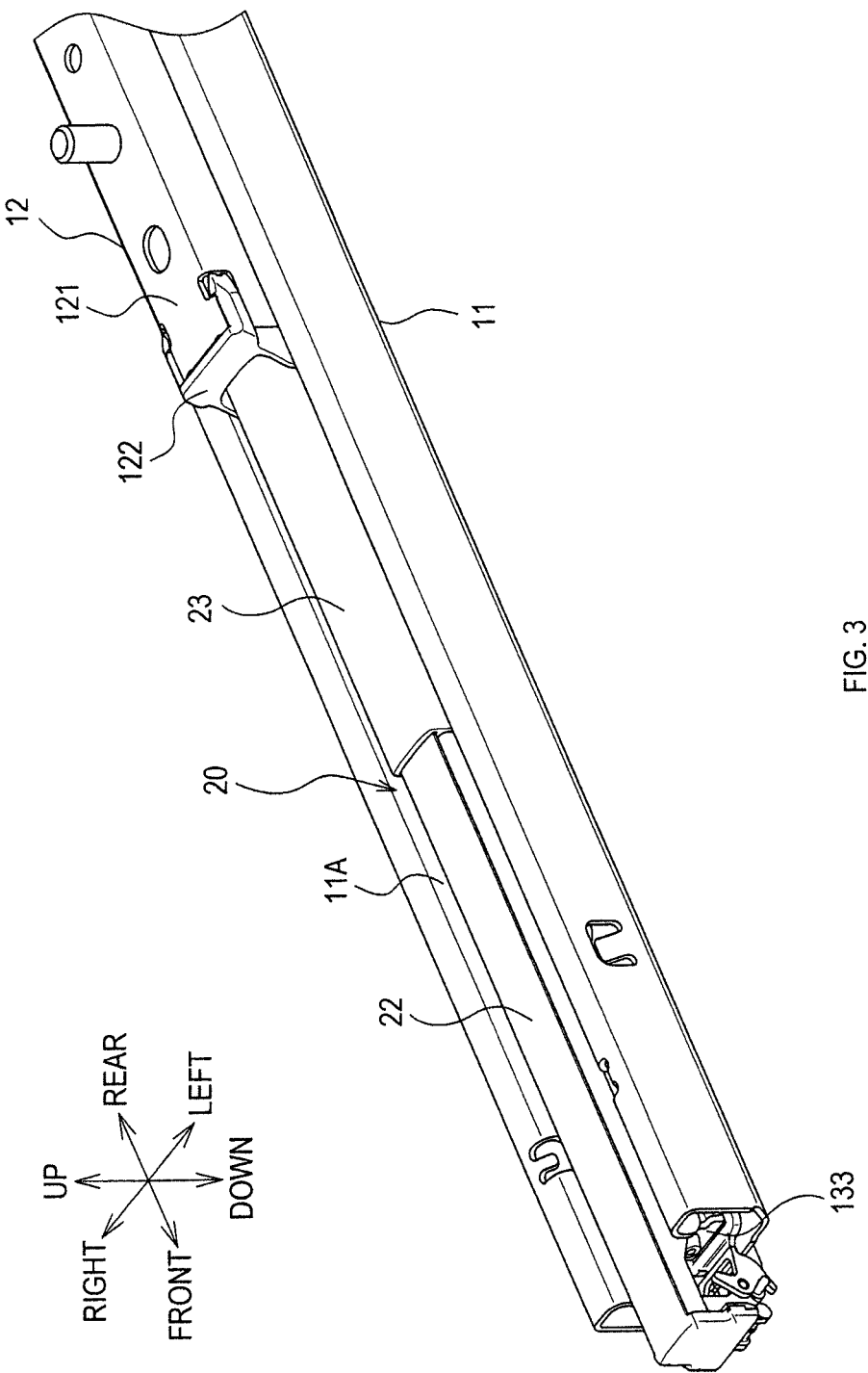
FIG. 3 is a diagram showing the sliding device according to the first embodiment.
Figure 4:
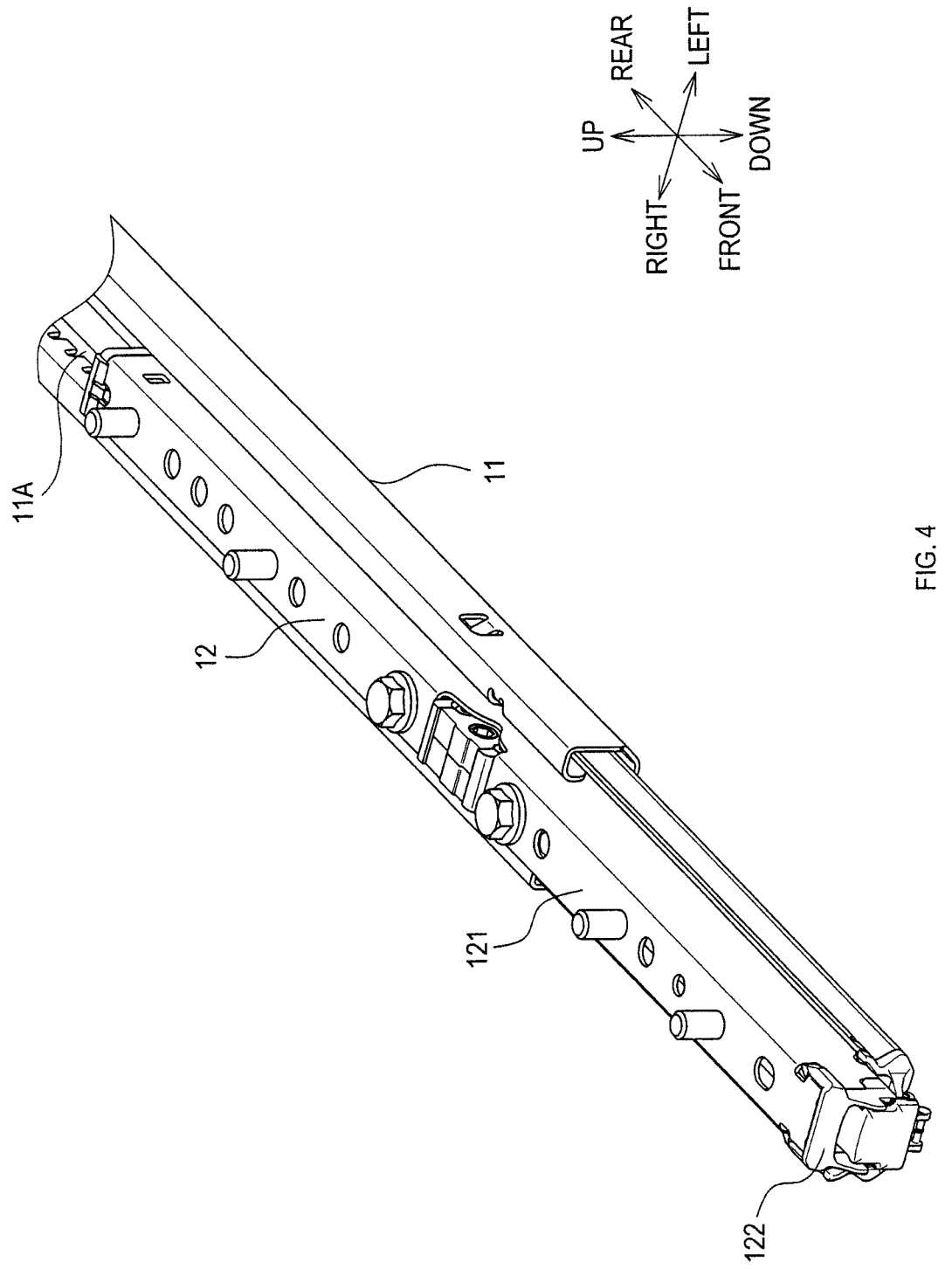
FIG. 4 is a diagram showing the sliding device according to the first embodiment.

The movable rail 12 is a member to which the seat body 2 is fixed. As shown in FIGS. 3 and 4, the movable rail 12 is slidable with respect to the fixed rail 11 in a state where at least part of the movable rail 12 is exposed through the opening 11A.

The "state where at least part of the movable rail 12 is exposed through the opening 11A" refers to a case in which at least part of the movable rail 12 is visible when the occupant sees by eye the sliding device 10 from above.

That is, the above-described "exposed state" is not limited to a state in which an upper end of the movable rail 12 is protruding from an upper end of the fixed rail 11. Thus, even when the upper end of the movable rail 12 is positioned below the upper end of the fixed rail 11, such a state may correspond to the "state where at least part of the movable rail 12 is exposed through the opening 11A".

As shown in FIG. 2, the movable rail 12 comprises at least a rail body 121 and two end caps 122. The rail body 121 is a metal member to which the seat body 2 is fixed. FIG. 2 shows only one of the end caps 122.

The two end caps 122 are resin members, one of which is attached to a longitudinal first end of the rail body 121 to cover the end and the other of which is attached to a longitudinal second end of the rail body 121 to cover the end. The end cap 122 shown in the figures is an end cap to cover a front end portion of the movable rail 12.

<Sliding Mechanism>

A sliding mechanism 13 shown in FIG. 2 is a mechanism to move the seat body 2 with respect to the fixed rail 11. The sliding mechanism 13 comprises at least a screw rod 131 and a gearbox 132.

Figure 5:
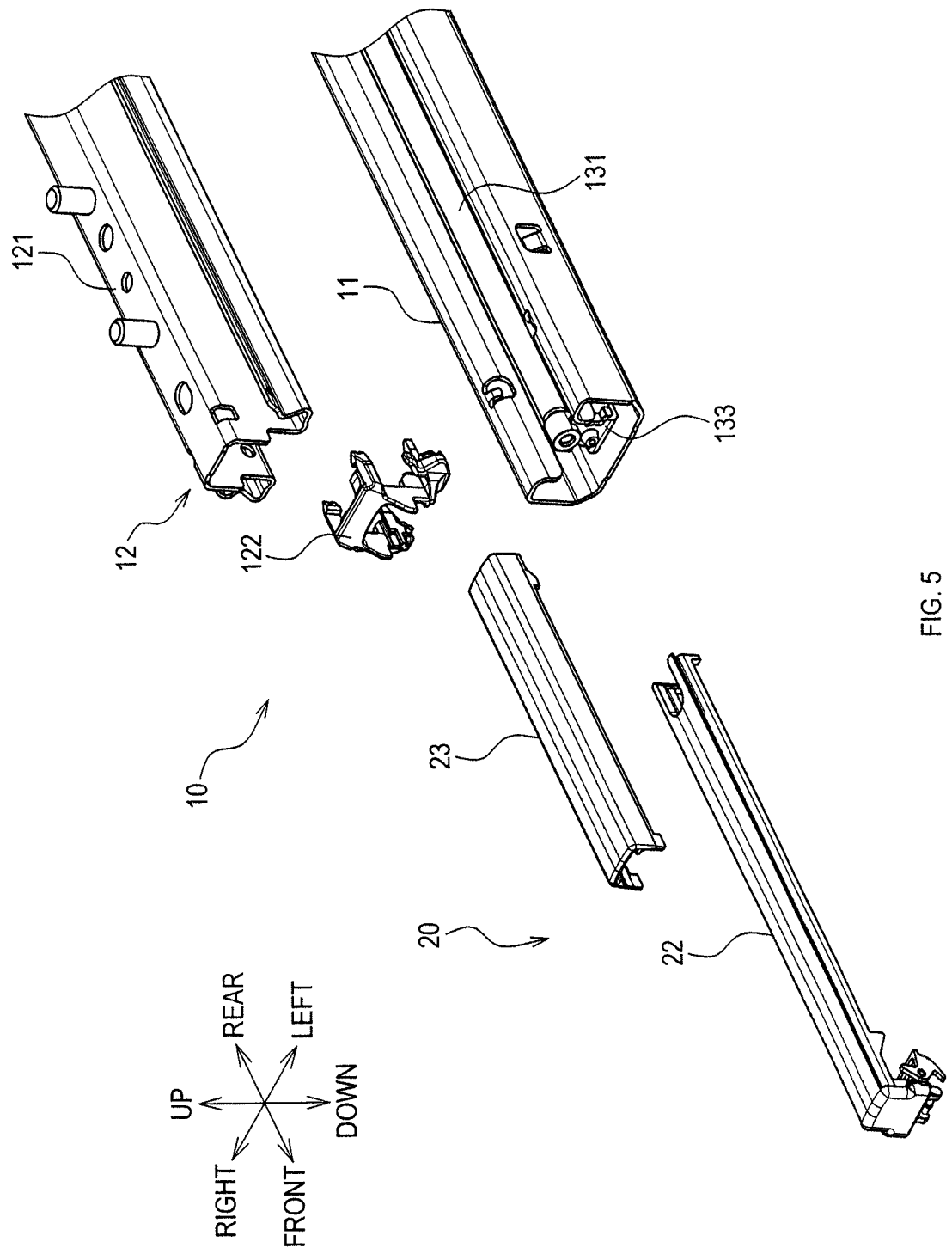
FIG. 5 is a diagram showing the sliding device according to the first embodiment.

As shown in FIG. 5, the screw rod 131 is retained within the fixed rail 11 via a retaining bracket 133 and so on. The screw rod 131 is a male screw extending in the longitudinal direction of the fixed rail 11. The retaining bracket 133 is fixed to the fixed rail 11.

The retaining bracket 133 retains an extending-direction first end (a seat-front end in the present embodiment) of the screw rod 131. An extending-direction second end of the screw rod 131 is retained by a second retaining bracket (not shown).

Figure 6:
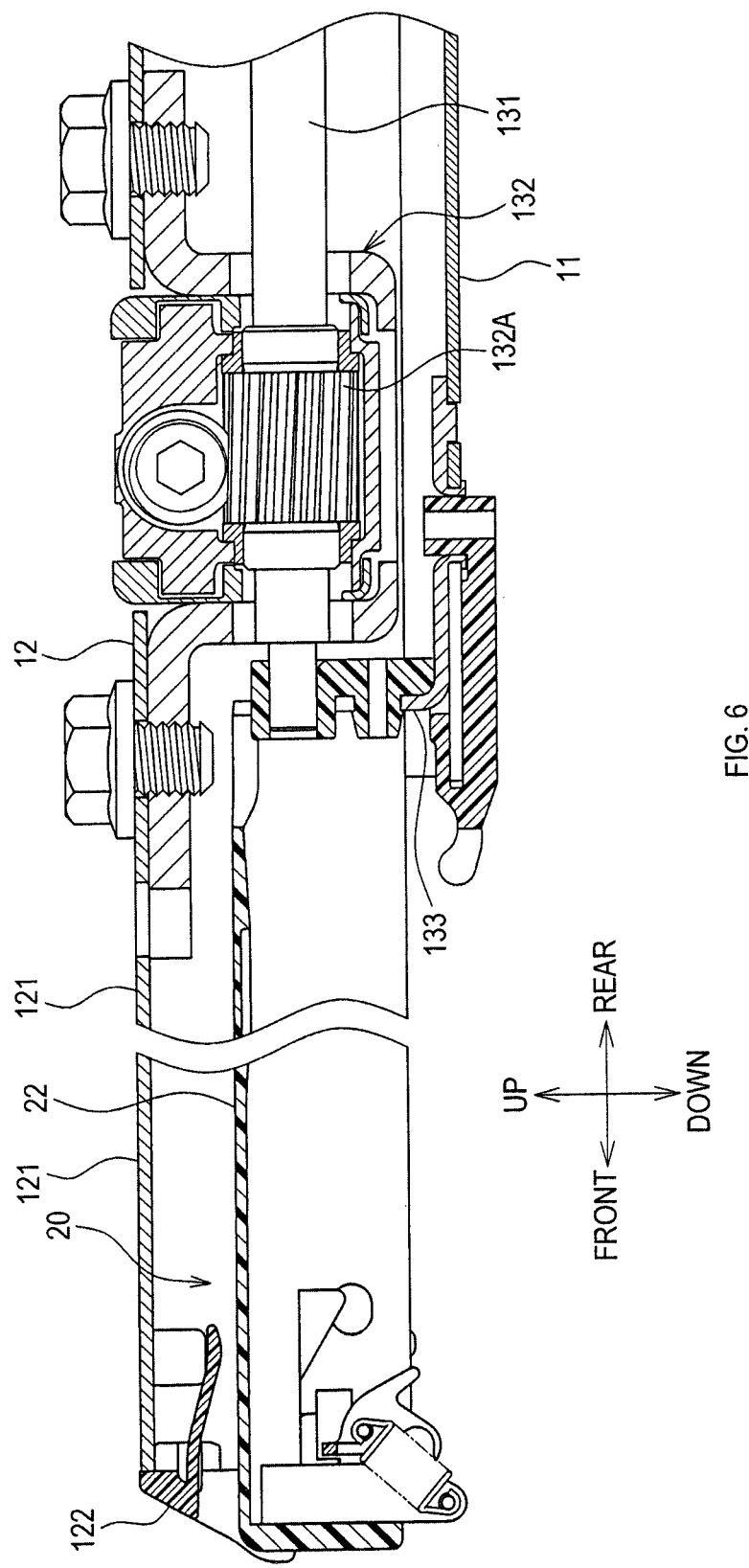
FIG. 6 is a diagram showing a structure of the sliding device according to the first embodiment.

The gearbox 132 is retained by the movable rail 12. As shown in FIG. 6, the gearbox 132 comprises a nut 132A having a female thread meshing with the screw rod 131. A toothed portion having a helical shape is provided on an outer periphery of the nut 132A.

In other words, the nut 132A is configured with a helical gear, and also a female thread meshing with the screw rod 131 is formed on an inner periphery of the nut 132A. The nut 132A (helical gear) rotates by receiving a rotational force from an electric motor (not shown).

The screw rod 131 is retained within the fixed rail 11 so as to be unrotatable via the two retaining brackets 133. Thus, when the nut 132A rotates, the movable rail 12, and thus the seat body 2, move with respect to the fixed rail 11 based on the principle of a screw.

<Shutter Mechanism>

A shutter mechanism is a mechanism for inhibiting a state in which the inside of the fixed rail 11 (the screw rod 131 in particular) is visible through the opening 11A (see FIG. 3). The shutter mechanism comprises the first shutter mechanism 20 (see FIG. 2), the second shutter mechanism (not shown), and so on.

The first shutter mechanism 20 closes part of the opening 11A located on a first longitudinal end side (a front end side in the present embodiment) of the fixed rail 11. The second shutter mechanism closes part of the opening 11A located on a second longitudinal end side (a rear end side in the present embodiment) of the fixed rail 11.

Such a configuration results in inhibiting the state in which the inside of the fixed rail 11 is visible. Part of the opening 11A between the first shutter mechanism 20 and the second shutter mechanism is closed by the movable rail 12. Thus, the opening 11A is closed throughout in a longitudinal direction thereof.

2.2 Shutter Mechanism

<Overview of Shutter Mechanism>

The first shutter mechanism 20 and the second shutter mechanism have the same structure. In the explanation below, the first shutter mechanism 20 will be described. As shown in FIG. 5, the first shutter mechanism 20 comprises at least a first shutter 22 and a second shutter 23.

As shown in FIG. 3, the first shutter 22 and the second shutter 23 close, in cooperation with each other, part of the opening 11A located on the first longitudinal end side of the fixed rail 11. The first shutter 22 and the second shutter 23 receive a force from the movable rail 12 to thereby slide with respect to the fixed rail 11 in conjunction with sliding of the movable rail 12.

Specifically, when the movable rail 12 slides toward a seat-front side, at least one of the first shutter 22 or the second shutter 23 slides toward the seat-front side. When the movable rail 12 slides toward a seat-rear side, at least one of the first shutter 22 or the second shutter 23 slides toward the seat-rear side.

<Overview of First Shutter>

Figure 7:
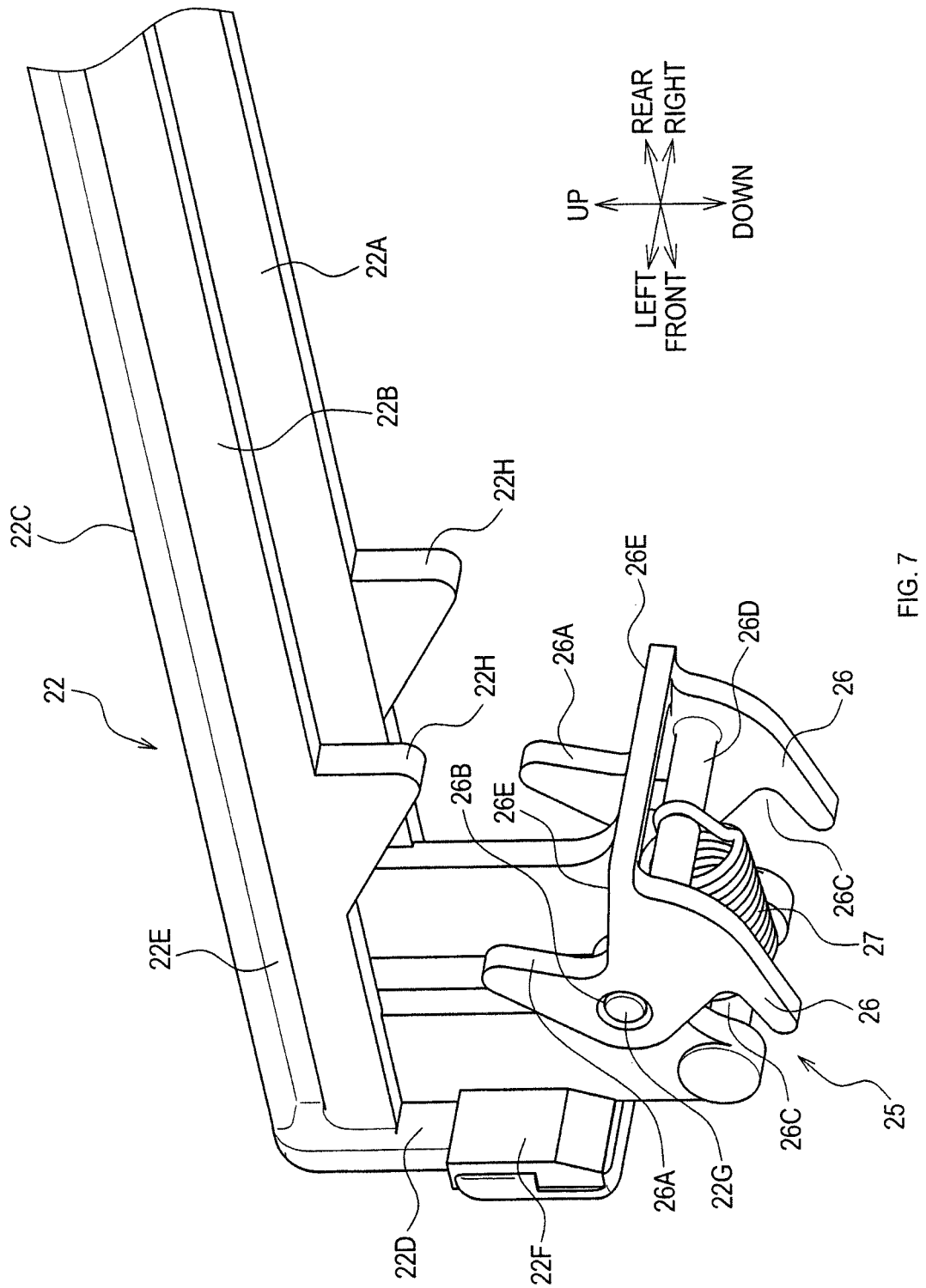
FIG. 7 is a diagram showing a first shutter according to the first embodiment.
Figure 8:
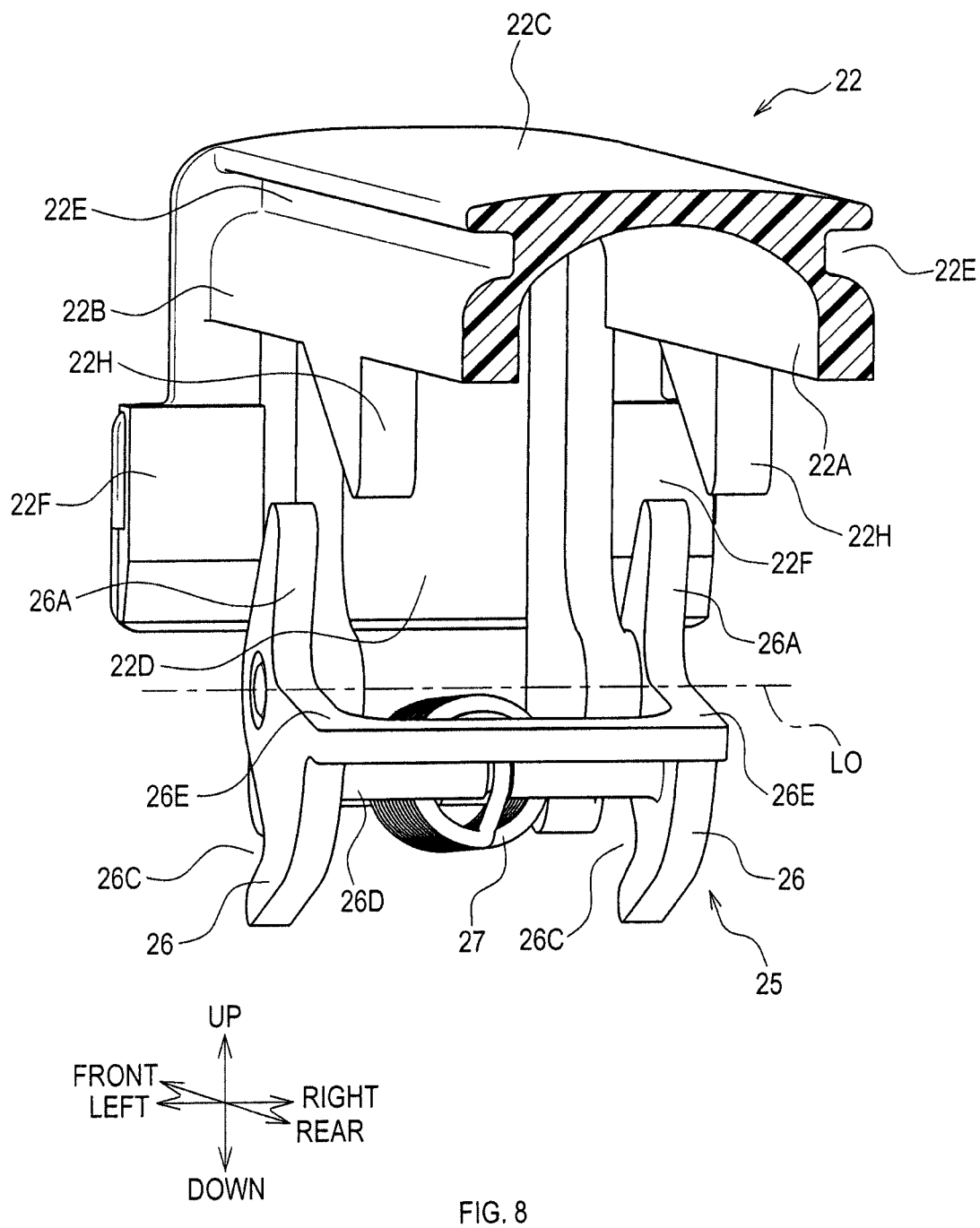
FIG. 8 is a diagram showing the first shutter according to the first embodiment.

As shown in FIGS. 7 and 8, a cross-section of the first shutter 22 orthogonal to a sliding direction thereof has a substantially U-shape with its lower side opened. This allows the first shutter 22 to cover the screw rod 131 from above.

Specifically, the first shutter 22 comprises at least a first wall 22A, a second wall 22B, and a top plate 22C. The first wall 22A and the second wall 22B extend parallel to the longitudinal direction of the fixed rail 11 in a state facing each other in a substantially horizontal direction. The top plate 22C couples an upper end of the first wall 22A and an upper end of the second wall 22B to each other.

An extending-direction first end (a seat-front end in the present embodiment) of the first shutter 22 is closed by an end wall 22D. The first wall 22A, the second wall 22B, the top plate 22C, and the end wall 22D form a one-piece article molded from a resin.

<Overview of Second Shutter>

Figure 9:
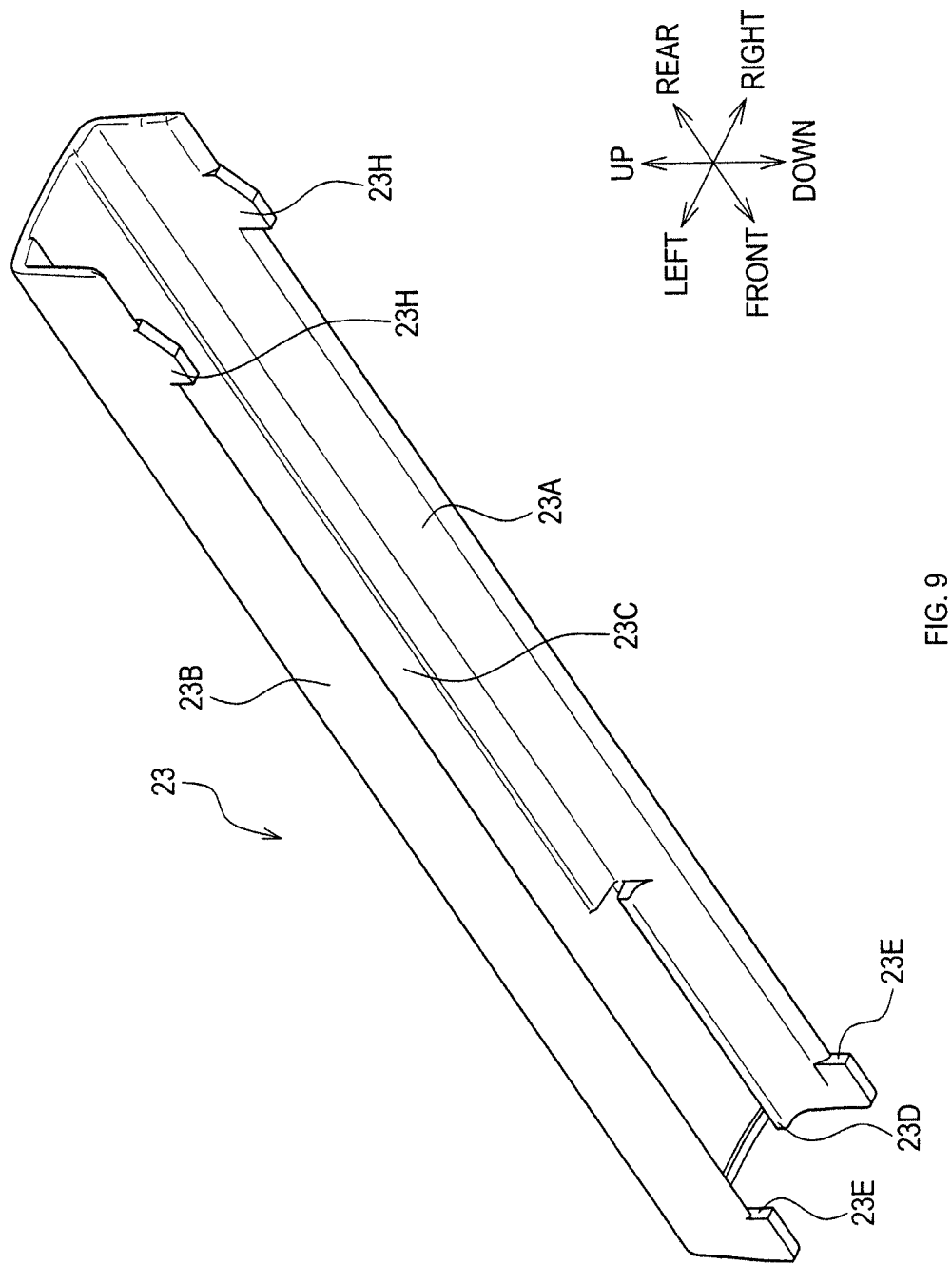
FIG. 9 is a diagram showing a second shutter according to the first embodiment.
Figure 10:
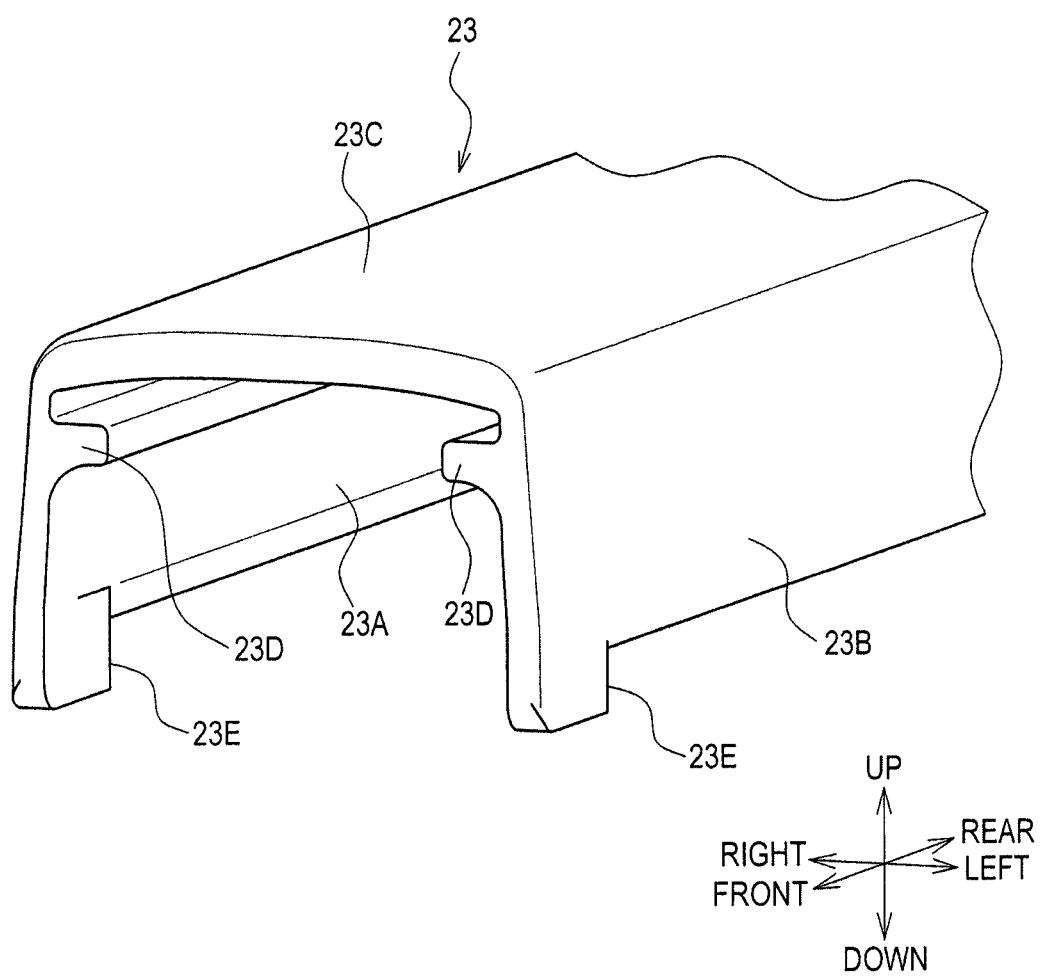
FIG. 10 is a diagram showing the second shutter according to the first embodiment.

As shown in FIGS. 9 and 10, a cross-section of the second shutter 23 orthogonal to a sliding direction thereof has a substantially U-shape with its lower side opened. This allows the second shutter 23 to cover the screw rod 131 from above.

Specifically, the second shutter 23 comprises at least a first wall 23A, a second wall 23B, and a top plate 23C. The first wall 23A and the second wall 23B extend parallel to the longitudinal direction of the fixed rail 11 in a state facing each other in a substantially horizontal direction. The top plate 23C couples an upper end of the first wall 23A and an upper end of the second wall 23B to each other.

Figure 11:
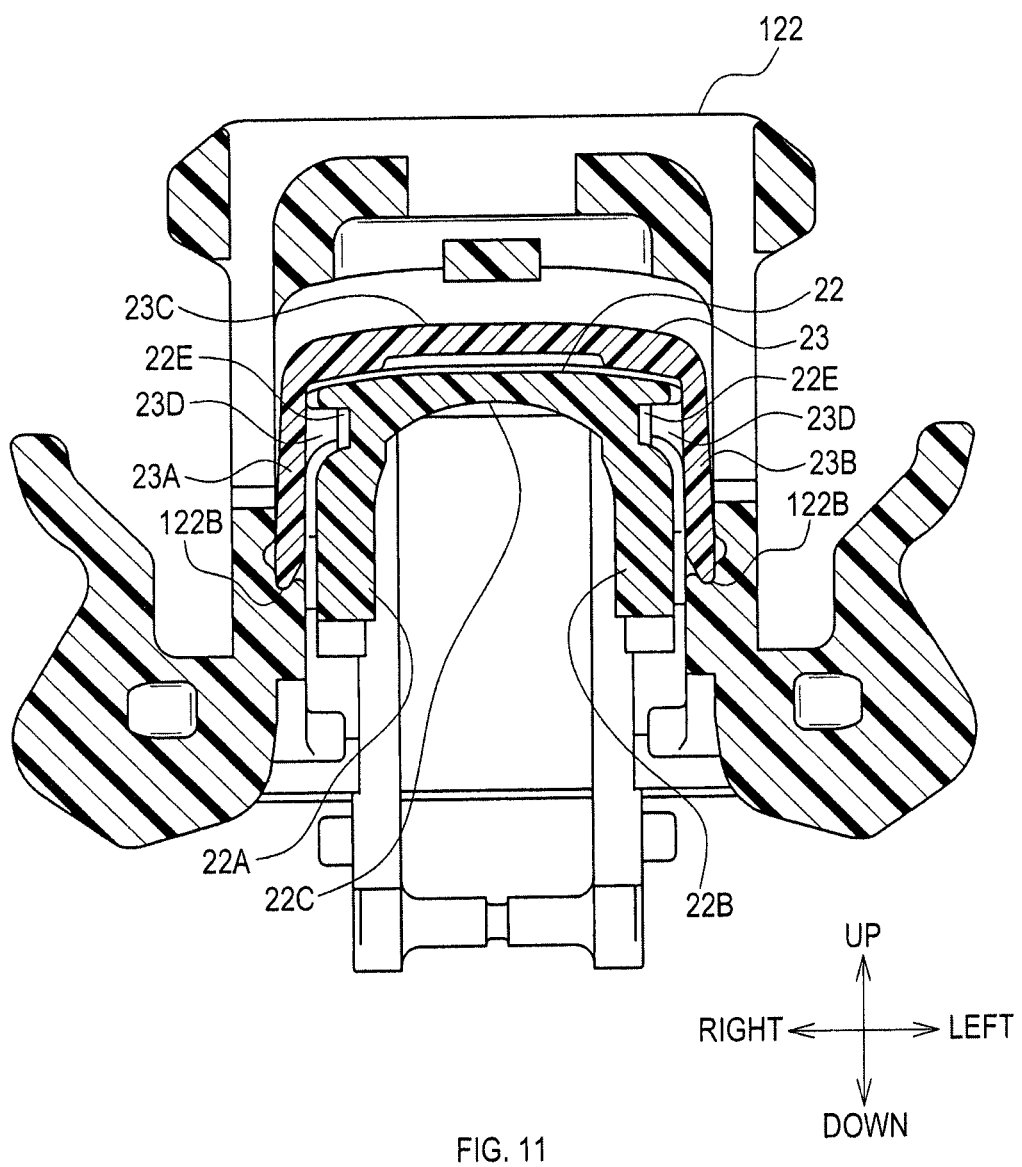
FIG. 11 is a diagram showing an end cap according to the first embodiment.

As shown in FIG. 11, the second shutter 23 is slidable while in sliding contact with an outside wall surface of the first shutter 22. In other words, the first shutter 22 is slidable while in sliding contact with inside wall surface of the second shutter 23.

As shown in FIG. 8, the first wall 22A and the second wall 22B of the first shutter 22 each comprise a groove 22E provided on an outside wall surface thereof. Each groove 22E extends in a direction parallel to the sliding direction (see FIG. 7).

As shown in FIG. 10, the first wall 23A and the second wall 23B of the second shutter 23 each comprise a ridge 23D provided on an inside wall surface thereof. Each ridge 23D extends from an extending-direction first end (a seat-front end in the present embodiment) of the second shutter 23 in a direction parallel to the sliding direction (see FIG. 9).

As shown in FIG. 11, each ridge 23D can be in sliding contact with the corresponding groove 22E while being fitted into the groove 22E. In this way, each ridge 23D and the corresponding groove 22E function as a guide for guiding a relative displacement of the second shutter 23 with respect to the first shutter 22.

The second shutter 23 is slidably supported by the end cap 122. The end cap 122 comprises two guides 122B. Each guide 122B is in sliding contact with the corresponding one of the first wall 23A and the second wall 23B of the second shutter 23 to thereby guide sliding of the second shutter 23.

2.3 Detailed Structure of Shutter Mechanism

<Configuration to Cause First Shutter and Second Shutter to Make Forward Movement>

In the first shutter mechanism 20, "forward movement" refers to sliding of the first shutter 22 and the second shutter 23 in a direction from a seat-rear side toward a seat-front side by receiving a pressing force from the movable rail 12. "Backward movement" refers to sliding in a direction opposite to such "forward movement".

In the first shutter mechanism 20, when the movable rail 12 slides in a direction from the seat-rear side toward the seat-front side, the above-described pressing force acts on the first shutter mechanism 20.

Specifically, when the movable rail 12 slides toward the seat-front side, the movable rail 12 applies the pressing force to at least one of the first shutter 22 or the second shutter 23.

In the movable rail 12 of the present embodiment, the end cap 122 is attached to an extending-direction first end (a seat-front end in the present embodiment) of the rail body 121. Thus, the first shutter 22 and the second shutter 23 receive a pressing force upon contact with the end cap 122.

Figure 12:
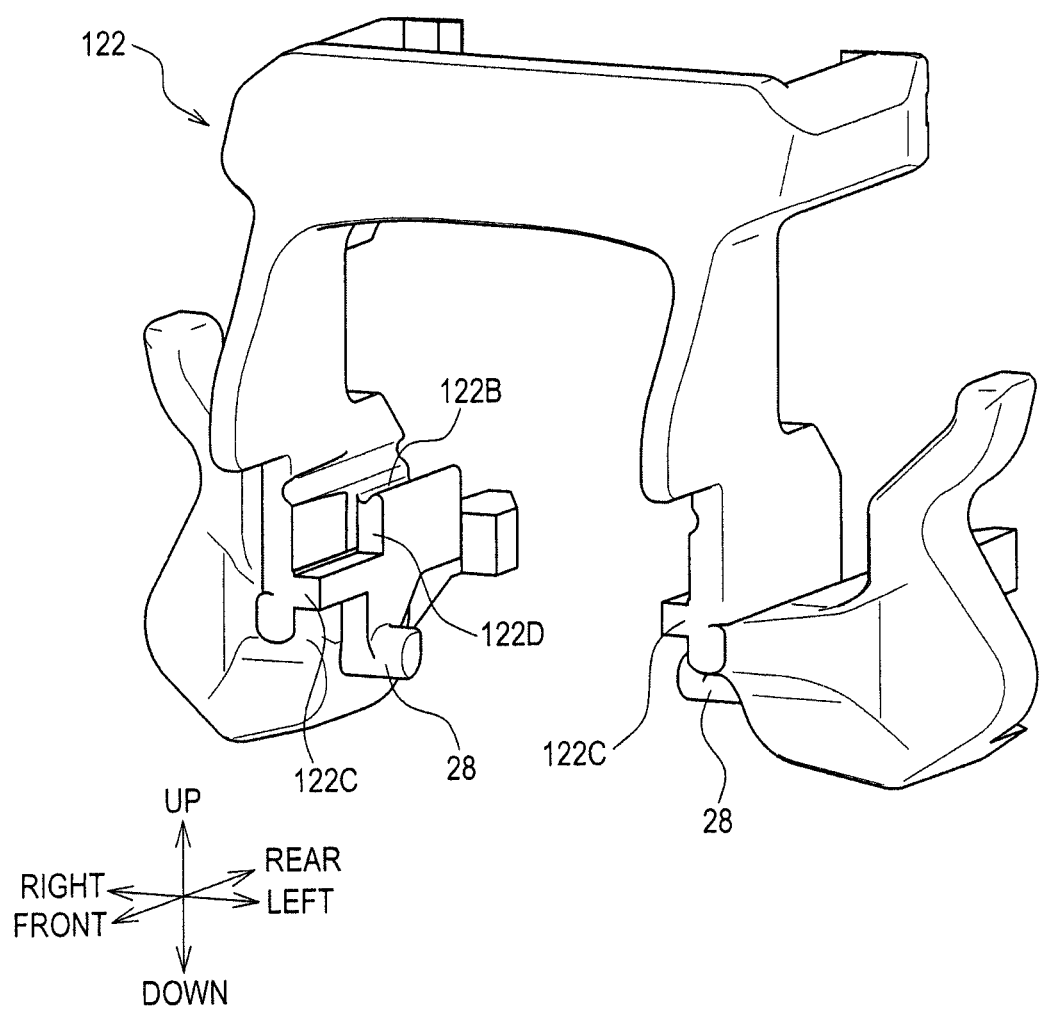
FIG. 12 is a diagram showing the end cap according to the first embodiment.
Figure 13:
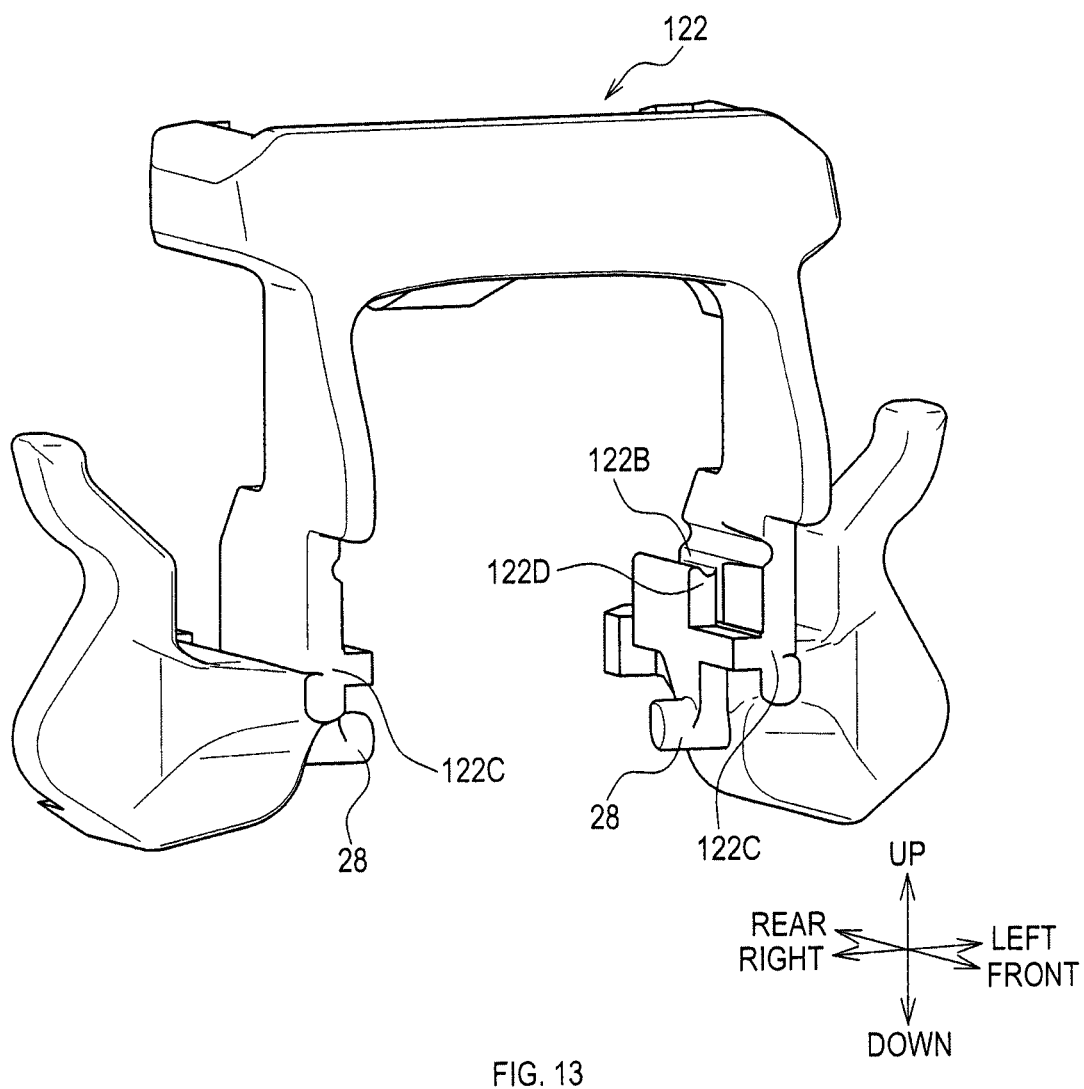
FIG. 13 is a diagram showing the end cap according to the first embodiment.
Figure 14:
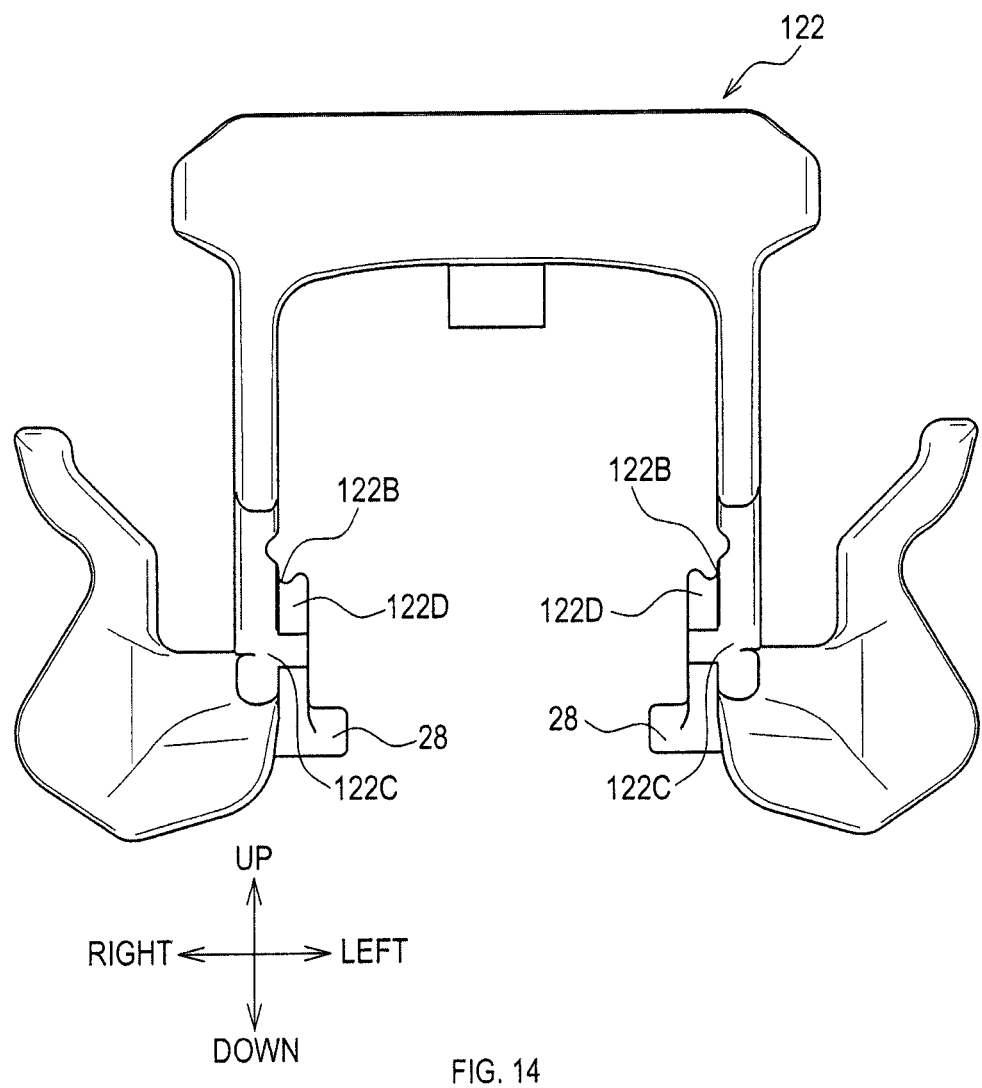
FIG. 14 is a diagram showing the end cap according to the first embodiment.

Specifically, as shown in FIGS. 12 to 14, the end cap 122 comprises a first pressing portion 122C and a second pressing portion 122D. The first shutter 22 comprises a first shutter pressed portion 22F (see FIG. 8) contactable with the first pressing portion 122C. The second shutter 23 comprises a second shutter pressed portion 23E (see FIG. 9) contactable with the second pressing portion 122D.

When the first pressing portion 122C comes in contact with the first shutter pressed portion 22F, that is, when the movable rail 12 comes in contact with the first shutter pressed portion 22F, the first shutter 22 receives a pressing force directly from the movable rail 12 to thereby slide.

When the second pressing portion 122D comes in contact with the second shutter pressed portion 23E (see FIG. 18), that is, when the movable rail 12 comes in contact with the second shutter pressed portion 23E, the second shutter 23 receives a pressing force directly from the movable rail 12 to thereby slide.

Specifically, when the movable rail 12 moves forward, the second pressing portion 122D first comes in contact with the second shutter pressed portion 23E of the second shutter 23. This causes the second shutter 23 to make a forward movement together with the movable rail 12 while receiving the pressing force from the movable rail 12.

When the movable rail 12 further moves forward from the state in which the second pressing portion 122D comes in contact with the second shutter pressed portion 23E, the first pressing portion 122C comes in contact with the first shutter pressed portion 22F of the first shutter 22. Even in the state where the first pressing portion 122C is in contact with the first shutter pressed portion 22F, a gap is present between a front end of the second shutter 23 and the end wall 22D of the first shutter 22.

That is, the second shutter 23 makes a forward movement by receiving a pressing force directly from the movable rail 12, and the first shutter 22 makes a forward movement by receiving a pressing force directly from the movable rail 12 without indirectly receiving the pressing force via the second shutter 23.

When the movable rail 12 further moves forward while applying the pressing force to the first shutter pressed portion 22F and the second shutter pressed portion 23E, as shown in FIG. 4, the first shutter 22 and the second shutter 23 slide forward together with the movable rail 12 while housed in the movable rail 12.

<Engagement Mechanism of First Shutter>

When the movable rail 12 moves forward from the state shown in FIG. 3, the second pressing portion 122D first comes in contact with the second shutter pressed portion 23E of the second shutter 23. This causes the second shutter 23 to make a forward movement together with the movable rail 12 while receiving the pressing force from the movable rail 12.

In this state, the first shutter pressed portion 22F of the first shutter 22 and the first pressing portion 122C are not in contact with each other, and thus, the first shutter 22 receives no pressing force from the movable rail 12 (i.e., the first pressing portion 122C).

However, since the second shutter 23 makes a forward movement while in sliding contact with the first shutter 22, a frictional force generated at a contact portion between the first shutter 22 and the second shutter 23 may cause the first shutter 22 to move forward together with the second shutter 23 with respect to the fixed rail 11.

Figure 15:
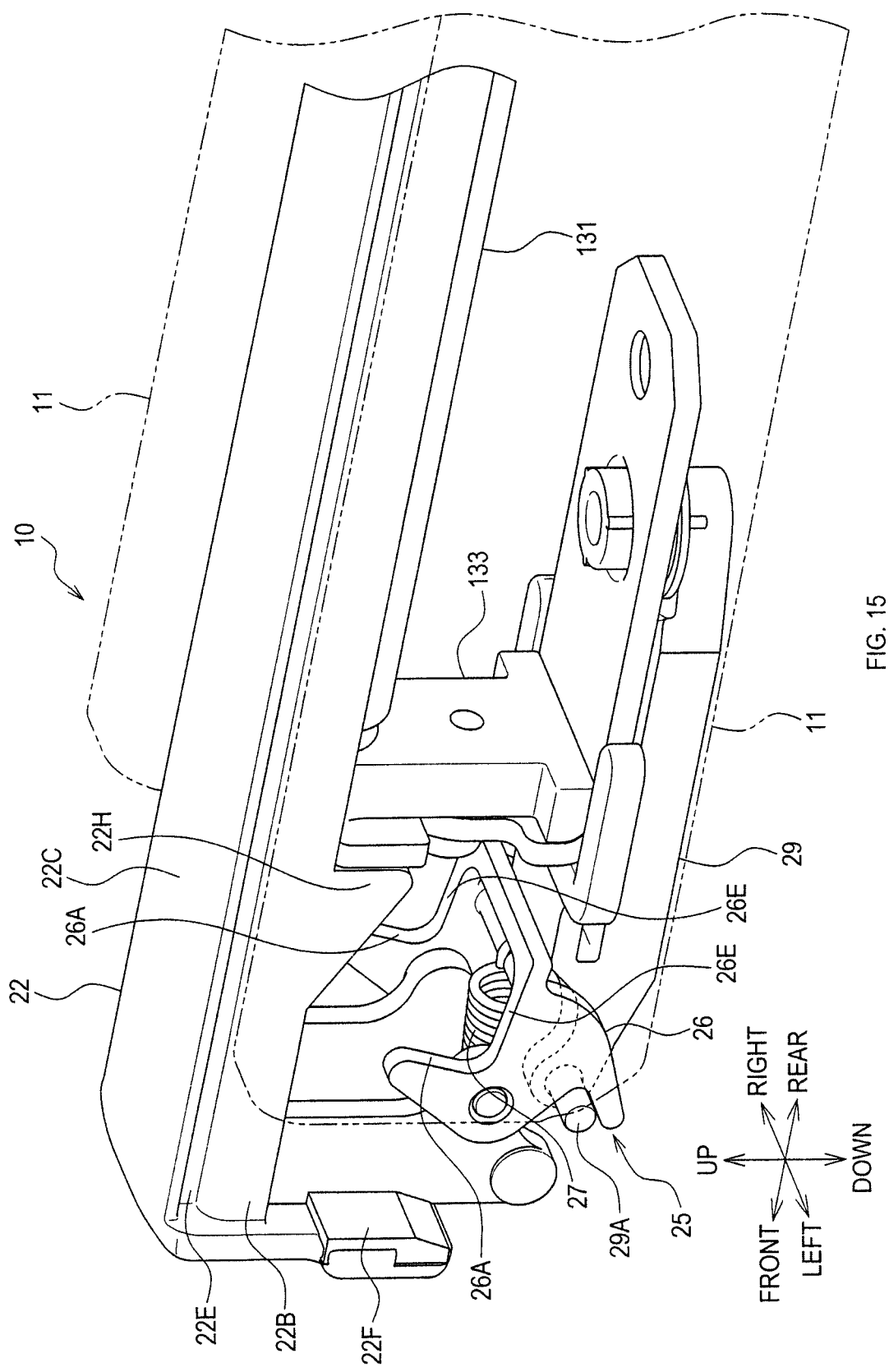
FIG. 15 is a diagram showing an engagement mechanism according to the first embodiment.

Thus, as shown in FIG. 15, the sliding device 10 of the present embodiment is provided with an engagement mechanism 25. The engagement mechanism 25 has a function of inhibiting the first shutter 22 from moving with respect to the fixed rail 11 before part of the movable rail 12 protrudes from the fixed rail 11 (see FIG. 4) during movement of the movable rail 12.

<Structure of Engagement Mechanism>

Figure 16:
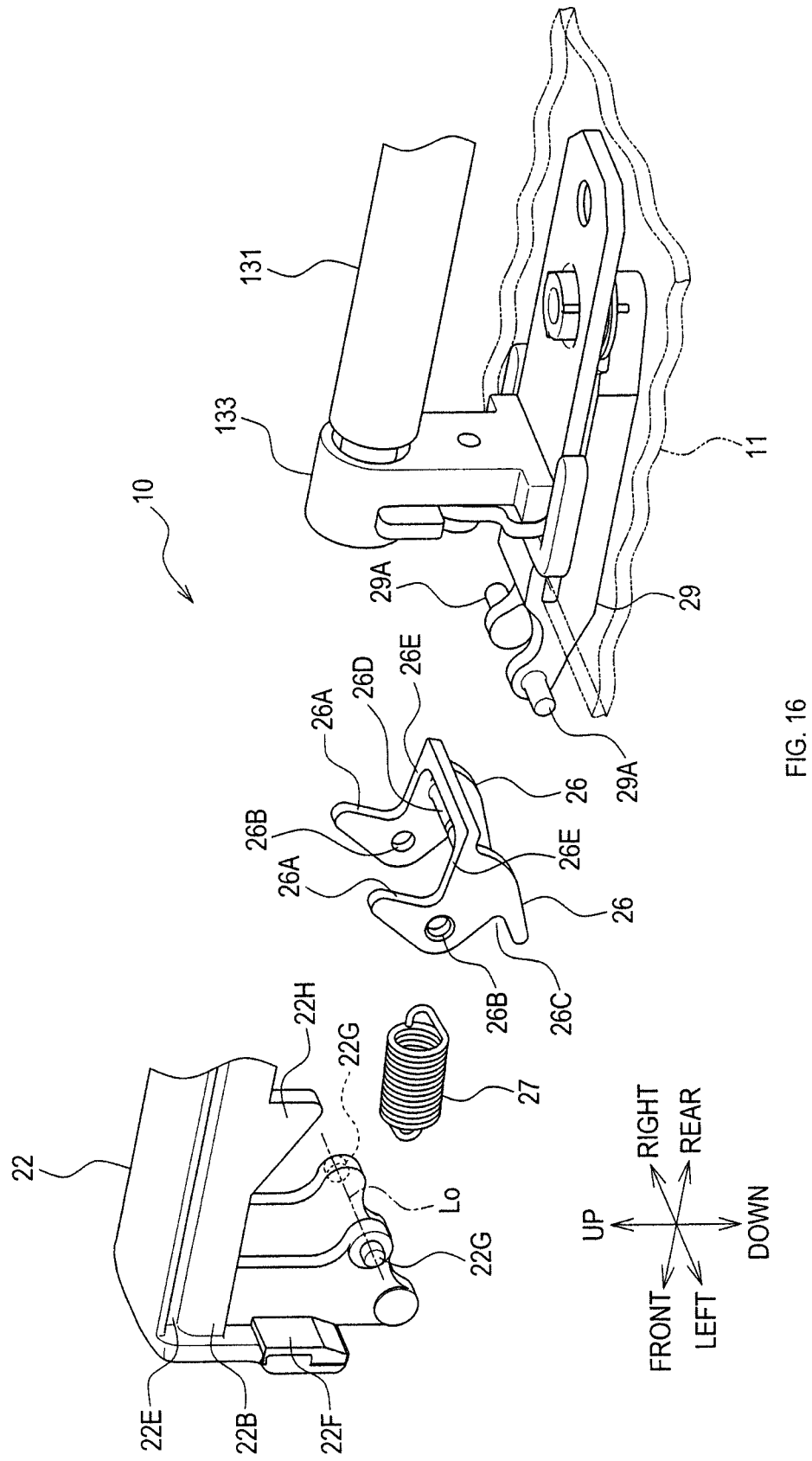
FIG. 16 is a diagram showing the engagement mechanism according to the first embodiment.

As shown in FIG. 16, the engagement mechanism 25 comprises at least an engaging body 26, an engaged portion 29A, a resilient element 27, an engaging body first pressed portion 26A, and a pressing portion 28 (see FIG. 12). In the present embodiment, the engaging body 26 is two in number. Correspondingly, the engaged portion 29A, the engaging body first pressed portion 26A, and the pressing portion 28 are each two in number.

The two engaging bodies 26, the two engaged portions 29A, the two engaging body first pressed portions 26A, and the two pressing portions 28 each have a symmetric structure and are configured to perform the same action. Each of the two engaging bodies 26 and the corresponding one of the two engaged portions 29A are integrated. In the explanation below, the engaging body 26 on the left side, the engaged portion 29A on the left side, the engaging body first pressed portion 26A on the left side, and the pressing portion 28 on the left side will be described.

<Engaging Body, Hook, and Engaged Portion>

As shown in FIG. 15, the engaging body 26 is provided to either one of the first shutter 22 and the fixed rail 11 (the first shutter 22 in the present embodiment), and the engaged portion 29A is provided to the other one of the first shutter 22 and the fixed rail 11 (the fixed rail 11 in the present embodiment).

As shown in FIG. 16, the engaged portion 29A is formed integrally with a stopper member 29 made of a resin, and is fixed to the fixed rail 11 via the stopper member 29. The stopper member 29 is fixed to the fixed rail 11 in a state positioned with respect to the retaining bracket 133.

The engaging body 26 comprises a hook 26C. The engaging body 26 is displaceable between an engaged position (see FIG. 17) in which the hook 26C is engageable with the engaged portion 29A and a disengaged position (see FIG. 20) in which the engaging body 26 is displaced from the engaged position.

The engaging body 26 is rotatably mounted to the first shutter 22. Specifically, as shown in FIG. 16, the first shutter 22 comprises a shaft portion 22G. A center axis of the shaft portion 22G is parallel to a direction substantially perpendicular to a sliding direction of the movable rail 12. The engaging body 26 comprises a shaft hole 26B into which the shaft portion 22G is rotatably fitted.

Such a configuration allows the engaging body 26 to be displaced pivotally between the engaged position and the disengaged position about a rotational axis Lo substantially perpendicular to the sliding direction of the movable rail 12. The rotational axis Lo of the present embodiment is substantially parallel to a width direction, namely left-right directions, of the seat body 2.

Figure 17:
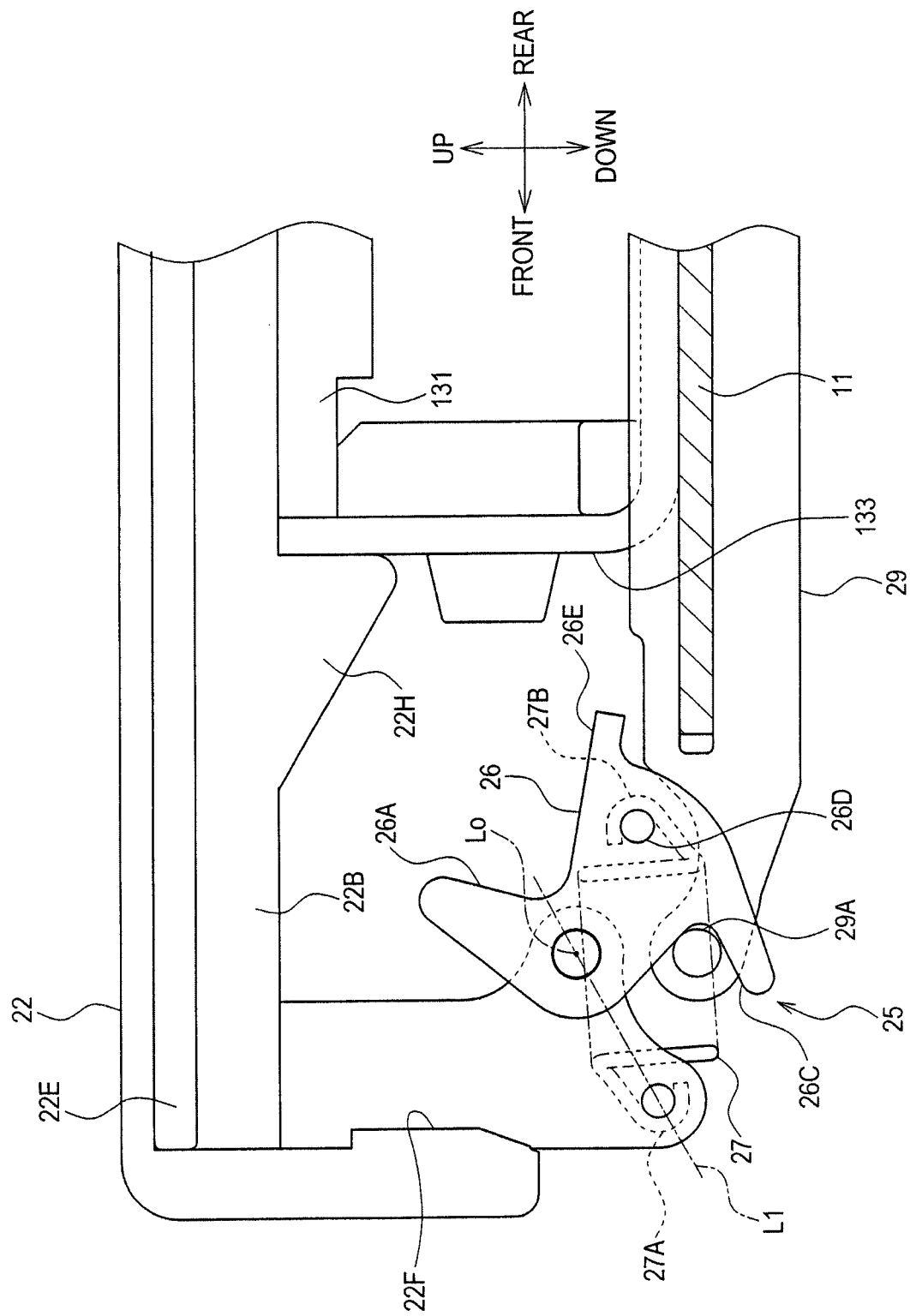
FIG. 17 is a diagram showing the engagement mechanism according to the first embodiment.

The engaged portion 29A has a columnar or cylindrical shape having a center axis substantially parallel to the rotational axis Lo. The hook 26C engages with the engaged portion 29A in a hooked manner. As shown in FIG. 17, in the engaged position, the hook 26C surrounds the engaged portion 29A from three directions.

When the hook 26C is in the engaged position, the hook 26C and the engaged portion 29A are positioned below the rotational axis Lo. The three directions in the present embodiment are an upper surface side of the engaged portion 29A, a lower surface side of the engaged portion 29A, and an extending-direction second end side of the rail body 121 (seat-rear side in the present embodiment).

<Resilient Element>

The resilient element 27 is a spring that can produce a resilient force for at least maintaining the engaging body 26 in the engaged position. The resilient element 27 of the present embodiment is configured with a coil spring. As shown in FIG. 17, a first end 27A of the resilient element 27 is coupled to the first shutter 22, and a second end 27B of the resilient element 27 is coupled to the engaging body 26.

The second end 27B of the resilient element 27 is coupled to the engaging body 26 on an opposite side of the first end 27A of the resilient element 27 across the rotation center of the engaging body 26, namely the rotational axis Lo. In the explanation below, the rotation center of the engaging body 26 is referred to as a rotation center Lo.

In the present embodiment, the engaging body 26 is two in number, and the resilient element 27 is one in number. Thus, the second end 27B of the resilient element 27 is coupled to substantially the center of a shaft member 26D connecting the two engaging bodies 26 to each other (see FIG. 7).

An imaginary line passing through the first end 27A of the resilient element 27 and the rotation center Lo is defined as a neutral line L1. A position of the second end 27B of the resilient element 27 in the engaged position (see FIG. 17) is defined as a first position. A position of the second end 27B of the resilient element 27 in the disengaged position (see FIG. 20) is defined as a second position. Based on such definitions, the first position is on an opposite side of the second position across the neutral line L1 (see FIG. 17).

That is, when the second end 27B of the resilient element 27 is positioned on the neutral line L1 (see FIG. 19), an amount of resilient deformation of the resilient element 27 becomes maximum. When the second end 27B of the resilient element 27 is displaced in either direction with respect to the neutral line L1, the resilient element 27 urges the engaging body 26 to be displaced in a direction increasing such displacement, with a restoring force of the resilient element 27.

<Pressing Portion and Pressed Portion>

Figure 18:
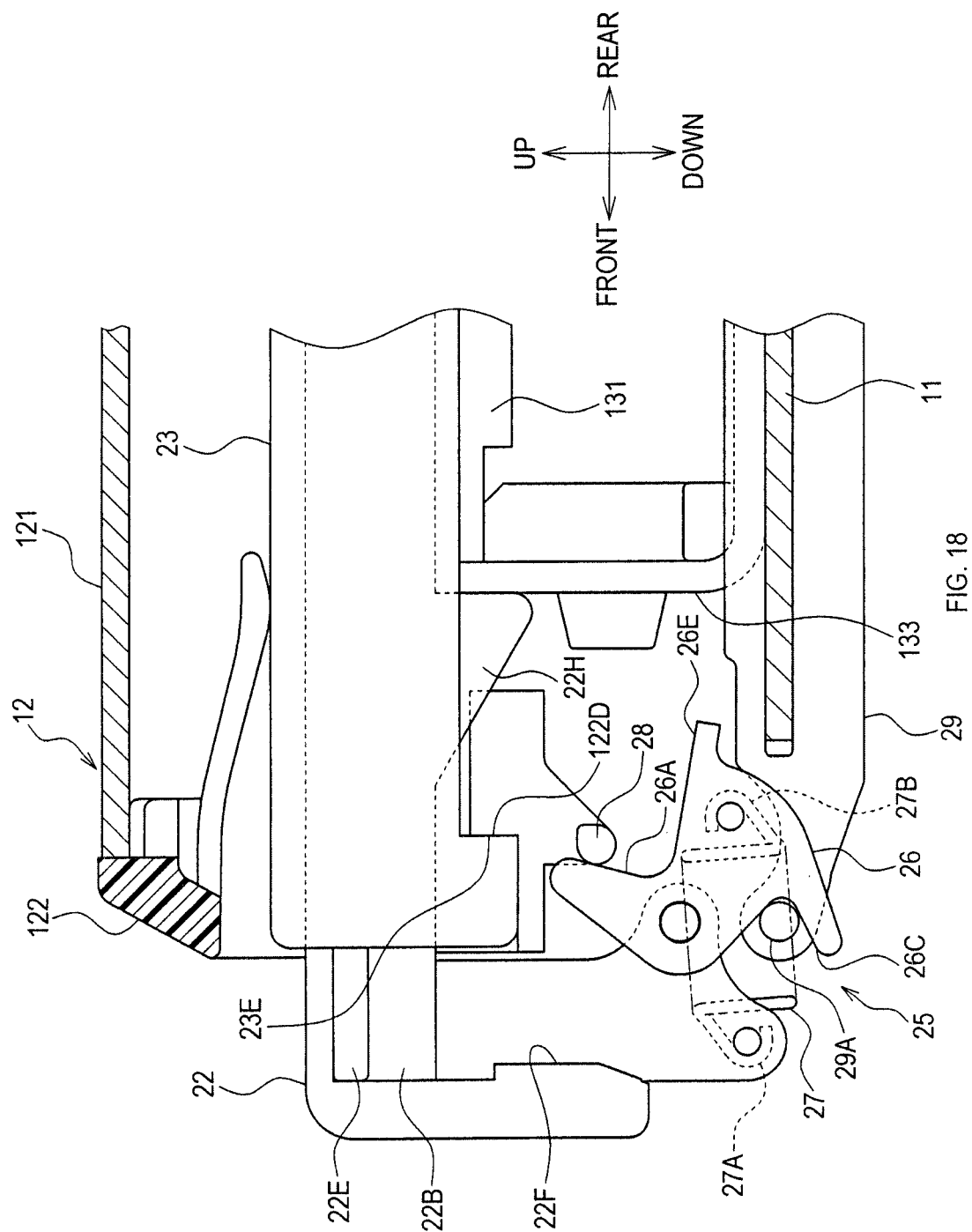
FIG. 18 is a diagram showing the engagement mechanism according to the first embodiment.
Figure 19:
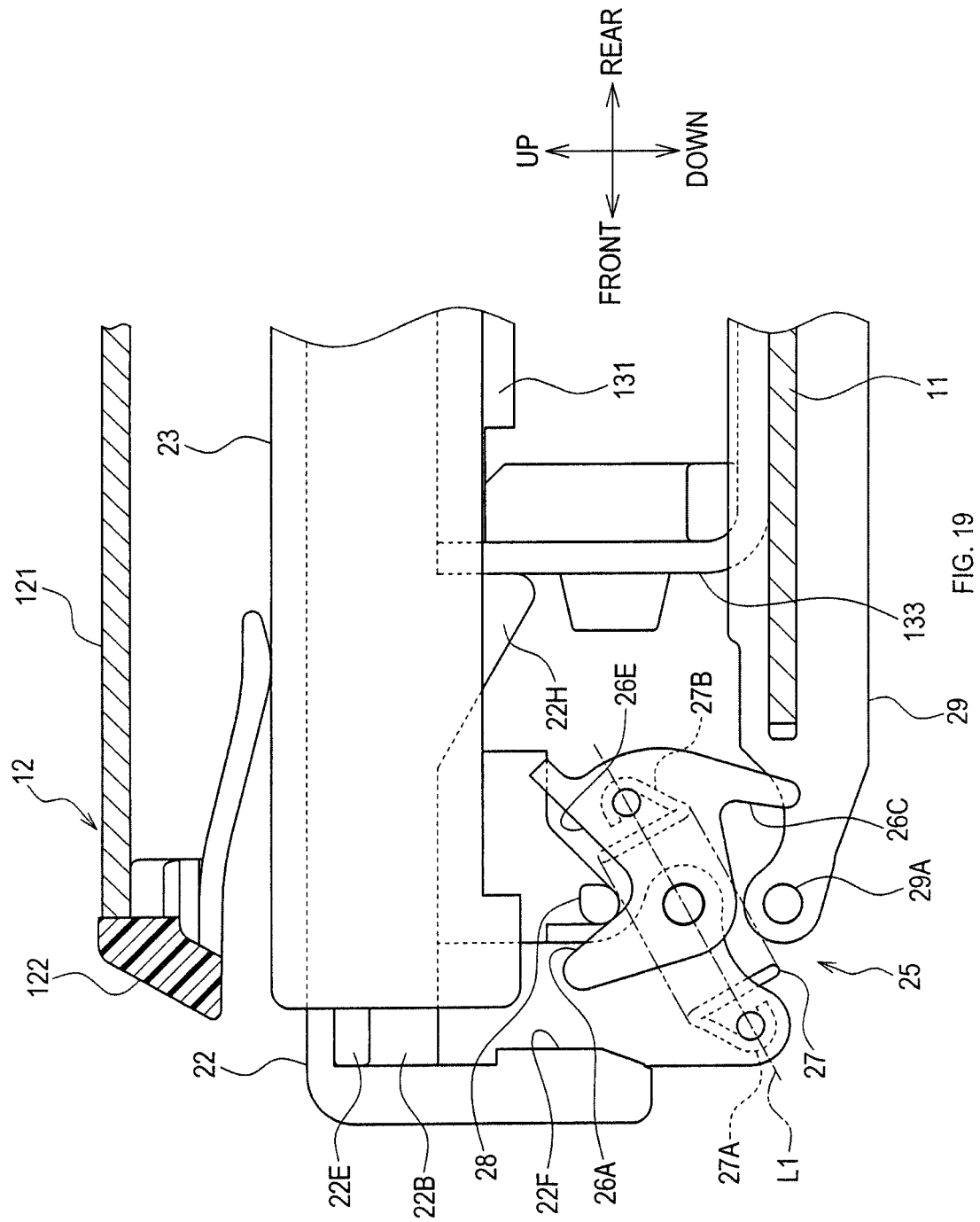
FIG. 19 is a diagram showing the engagement mechanism according to the first embodiment.

As shown in FIGS. 18 and 19, the pressing portion 28 displaces the engaging body 26 toward the disengaged position upon contact with the engaging body first pressed portion 26A provided to the engaging body 26 during sliding of the movable rail 12.

The pressing portion 28 is provided to the movable rail 12 or the first shutter 22. In the present embodiment, as shown in FIGS. 12 and 13, the pressing portion 28 is provided to the end cap 122, namely to the movable rail 12. In the present embodiment, the engaging body first pressed portion 26A is two in number; thus, the pressing portion 28 is also two in number.

Figure 21:
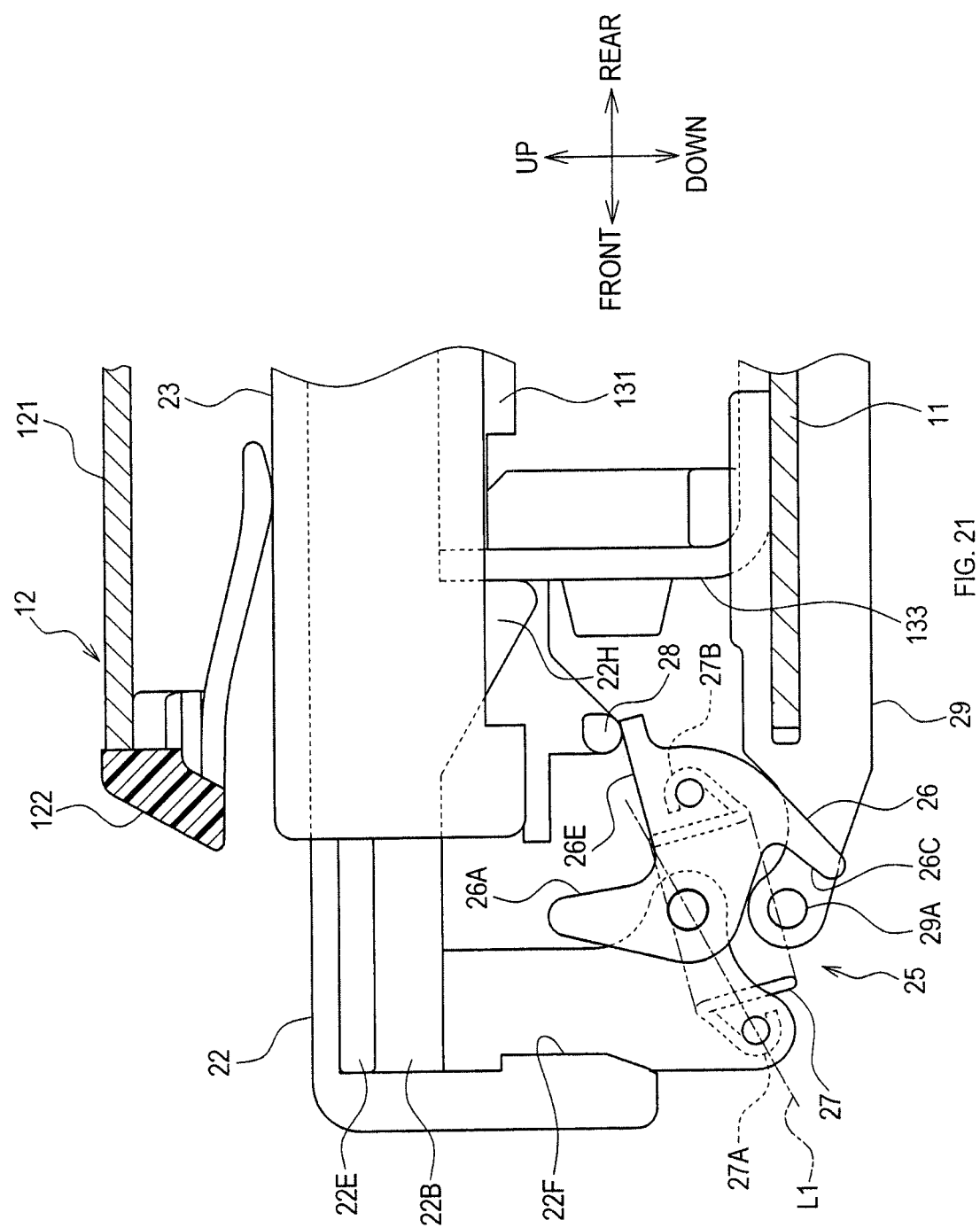
FIG. 21 is a diagram showing the engagement mechanism according to the first embodiment.

The engaging body 26 of the present embodiment comprises an engaging body second pressed portion 26E. When the movable rail 12 moves forward, the pressing portion 28 comes in contact with the engaging body first pressed portion 26A. When the movable rail 12 moves backward, the pressing portion 28 comes in contact with the engaging body second pressed portion 26E (see FIG. 21).

As shown in FIG. 15, the first shutter 22 comprises a contact portion 22H. The contact portion 22H restricts the first shutter 22, during the backward movement thereof, from moving more backward than a specified position with respect to the fixed rail 11.

Specifically, when the first shutter 22 reaches the specified position, the contact portion 22H comes in contact with the retaining bracket 133. This results in restriction of the first shutter 22 from moving more backward than the specified position with respect to the fixed rail 11.

<Operation of Engagement Mechanism>

When the movable rail 12 is in the state shown in FIG. 3, the engaging body 26 (the hook 26C) is in a state engaged with the engaged portion 29A as shown in FIG. 17. In this state, the second end 27B of the resilient element 27 is positioned on the engaged portion 29A side with respect to the neutral line L1, and thus, the resilient element 27 applies, to the engaging body 26, a resilient force maintaining the engaging body 26 in the engaged position.

When the movable rail 12 (the end cap 122) further moves forward from the state shown in FIG. 17, the pressing portion 28 is brought into contact with the engaging body first pressed portion 26A as shown in FIG. 18. When the pressing portion 28 further moves forward from such a state, the engaging body first pressed portion 26A rotates in a forward direction (see FIG. 19), and thus, the engaging body 26 (the hook 26C) rotates to the disengaged position (see FIG. 20).

In this state, the second end 27B of the resilient element 27 is on an opposite side of the engaged portion 29A with respect to the neutral line L1, and thus, the resilient element 27 applies, to the engaging body 26, a resilient force maintaining the engaging body 26 in the disengaged position.

Figure 20:
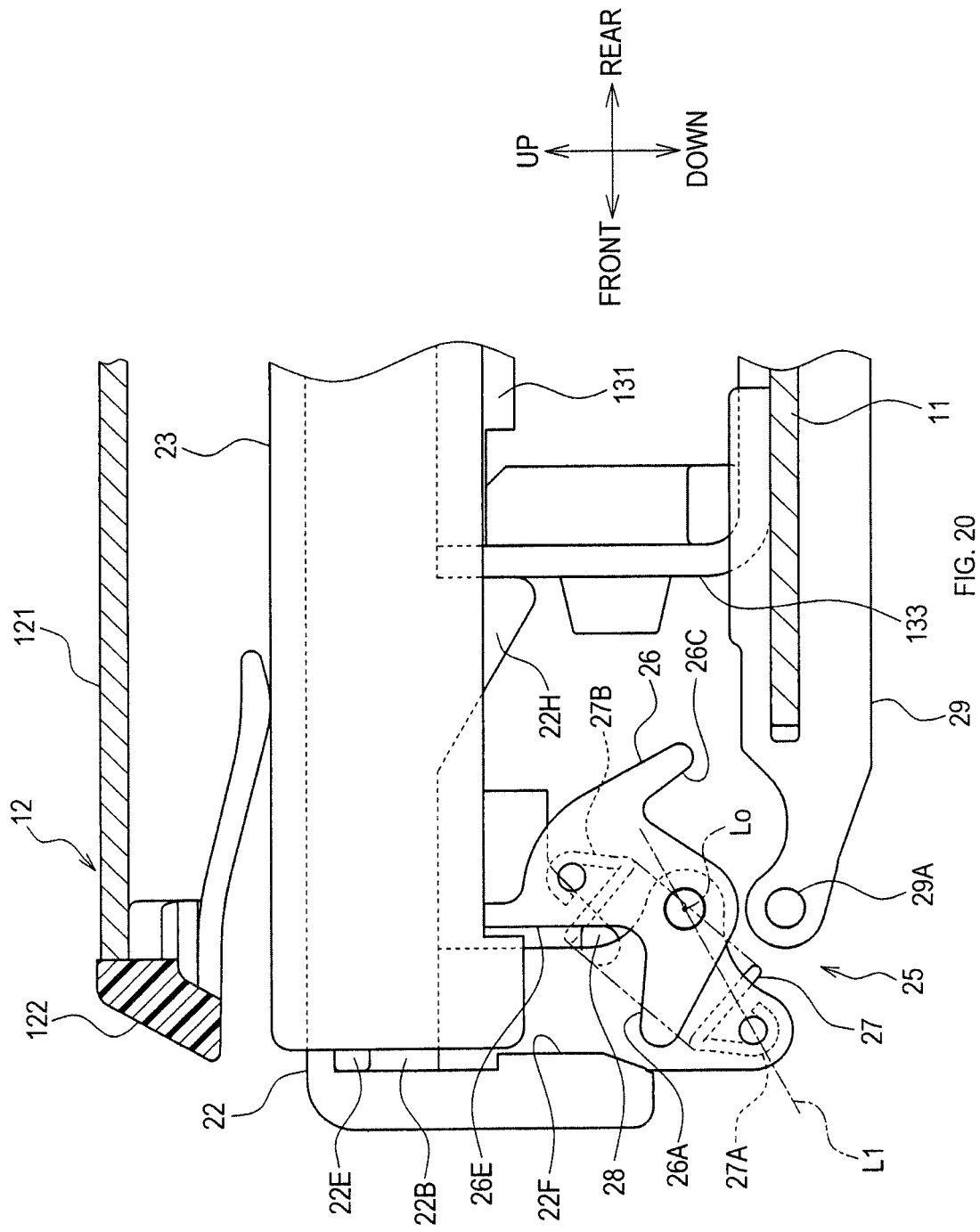
FIG. 20 is a diagram showing the engagement mechanism according to the first embodiment.

When the movable rail 12 further moves forward from the state shown in FIG. 20, the first pressing portion 122C of the end cap 122 comes in contact with the first shutter pressed portion 22F of the first shutter 22, and thus, the first shutter 22 makes a forward movement integrally with the movable rail 12 (see FIG. 4).

When the movable rail 12 moves backward from the state shown in FIG. 4, the pressing portion 28 is brought into an engagement state in which it is caught with the engaging body second pressed portion 26E (see FIG. 20), and thus, the first shutter 22 makes a backward movement integrally with the movable rail 12.

When the movable rail 12 further moves backward and the contact portion 22H comes in contact with the retaining bracket 133, the backward movement of the first shutter 22 is stopped. When the movable rail 12 further moves backward from such a state, the engaging body second pressed portion 26E is pressed in a backward direction by the pressing portion 28, and thus, the second end 27B of the resilient element 27 moves toward the engaged portion 29A over the neutral line L1 (see FIG. 21).

In this way, the resilient element 27 applies, to the engaging body 26, the resilient force maintaining the engaging body 26 in the engaged position, and thus, the engaging body 26 (the hook 26C) engages with the engaged portion 29A and such an engagement state is maintained (see FIG. 17).

<Configuration to Cause First Shutter and Second Shutter to Make Backward Movement>

As described above, the first shutter 22 makes a backward movement together with the movable rail 12 by engagement of the pressing portion 28 with the engaging body second pressed portion 26E. The second shutter 23 makes a backward movement by being pressed by the first shutter 22.

<Sliding Operation of First Shutter and Second Shutter>

When the movable rail 12 moves forward from the state shown in FIG. 3 and also before the second pressing portion 122D of the end cap 122 (see FIG. 14) comes in contact with the second shutter pressed portion 23E of the second shutter 23 (see FIG. 9), only the movable rail 12 moves forward.

In this state, the engaging body 26 (the hook 26C) is engaged with the engaged portion 29A, and thus, the first shutter 22 does not slide with respect to the fixed rail 11 (see FIG. 17). The second shutter 23 hardly slides due to a frictional force generated at a position thereof in contact with the first shutter 22.

When the second pressing portion 122D comes in contact with the second shutter pressed portion 23E, the second shutter 23 and the movable rail 12 integrally move forward with the second shutter 23 housed in the movable rail 12.

When the pressing portion 28 further moves forward from the state where the pressing portion 28 of the end cap 122 is in contact with the engaging body first pressed portion 26A of the engaging body 26 (see FIG. 18), the engaging body first pressed portion 26A rotates in the forward direction (see FIG. 19), and thus, the engaging body 26 (the hook 26C) rotates to the disengaged position (see FIG. 20).

When the movable rail 12 further moves forward, the first shutter 22 and the second shutter 23 integrally make a forward movement together with the movable rail 12 (see FIG. 4) in a state where the first pressing portion 122C is in contact with the first shutter pressed portion 22F and also where the second pressing portion 122D is in contact with the second shutter pressed portion 23E.

When the movable rail 12 moves backward, the pressing portion 28 of the end cap 122 is engaged with the engaging body second pressed portion 26E of the engaging body 26 (see FIG. 20), and thus, the first shutter 22 makes a backward movement integrally with the movable rail 12.

In this state, the second shutter 23 makes a backward movement together with the first shutter 22 by receiving a force from the first shutter 22. When the movable rail 12 further moves backward and the contact portion 22H of the first shutter 22 comes in contact with the retaining bracket 133 (see FIG. 21), the backward movement of the first shutter 22 is stopped.

When the movable rail 12 further moves backward from such a state, the engaging body second pressed portion 26E is pressed in the backward direction by the pressing portion 28, and thus, the engaging body 26 (the hook 26C) engages with the engaged portion 29A and such an engagement state is maintained (see FIG. 17). Thus, even when the movable rail 12 further moves backward, the first shutter 22 does not make a backward movement.

When the movable rail 12 further moves backward with the movable rail 12 housed in the fixed rail 11, only the movable rail 12 moves backward until the movable rail 12 (the end cap 122) comes in contact with a locking protrusion 23H (FIG. 9) of the second shutter 23.

When the movable rail 12 further moves backward in a state where the end cap 122 is in contact with the locking protrusion 23H, the second shutter 23 becomes locked with the end cap 122 via the locking protrusion 23H, and thus, the second shutter 23 and the movable rail 12 move backward integrally.

3. Characteristics of Vehicle Seat (Sliding Device, in Particular) of Present Embodiment In the present embodiment, when the movable rail 12 is positioned within the fixed rail 11, the engaging body 26 (the hook 26C) and the engaged portion 29A engage with each other to thereby maintain the position of the first shutter 22.

When part of the movable rail 12 is positioned outside the fixed rail 11, the engagement between the engaging body 26 and the engaged portion 29A is released by the forward movement of the movable rail 12, and the first shutter 22 can slide integrally with the movable rail 12. Accordingly, the first shutter 22 can reliably slide together with the movable rail 12 by receiving the force from the movable rail 12.

The engaging body 26 is provided to the first shutter 22, the engaged portion 29A is provided to the fixed rail 11, and the pressing portion 28 is provided to the movable rail 12. This can inhibit the sliding device 10 from having a complicated configuration.

The engaging body 26 is displaced rotationally about the rotational axis Lo substantially perpendicular to the sliding direction of the movable rail 12. This can inhibit the sliding device 10 from having a complicated configuration.

The position ("the first position") of the second end 27B of the resilient element 27 in the engaged position is on the opposite side of the position ("the second position") of the second end 27B of the resilient element 27 in the disengaged position across the neutral line L1.

This allows the engaging body 26 to be maintained in the engaged position when the second end 27B of the resilient element 27 is in the first position. When the second end 27B of the resilient element 27 is in the second position, the engaging body 26 is maintained in the disengaged position. Accordingly, the first shutter 22 operates stably and reliably.

The engaging body 26 comprises the hook 26C surrounding the engaged portion 29A from the three directions in the engaged position (see FIG. 17). Such a configuration inhibits the engaging body 26 and the engaged portion 29A from being easily disengaged even when an external force is applied to the engaging body 26.

In the engaged position, the hook 26C and the engaged portion 29A are positioned below the rotational axis Lo (see FIG. 17). Such a configuration inhibits the engaging body 26 and the engaged portion 29A from being easily disengaged even when a force directed upward from below is applied to the engaging body 26.

OTHER EMBODIMENTS

The sliding device 10 of the above-described embodiment is configured such that the first shutter 22 and the second shutter 23 receive the pressing force directly from the movable rail 12 (the end cap 122). However, the present disclosure is not limited to this. Specifically, a configuration may be adopted in which, for example, the first shutter 22 receives the pressing force via the second shutter 23.

The movable rail 12 of the above-described embodiment is configured with the rail body 121 and the end cap 122, and the first pressing portion 122C and the second pressing portion 122D provided to the end cap 122 are configured to press the first shutter 22 and the second shutter 23, respectively.

However, the present disclosure is not limited to this. For example, the sliding device 10 may have a configuration in which the first shutter 22 and the second shutter 23 are pressed by the rail body 121.

In the above-described embodiment, the first shutter pressed portion 22F is provided on a forward end side of the first shutter 22, and the second shutter pressed portion 23E is provided on a forward end side of the second shutter 23. However, the present disclosure is not limited to this.

In the above-described embodiment, the configuration is such that, in the state where the first shutter 22 and the second shutter 23 are housed in the fixed rail 11, the first shutter pressed portion 22F and the second shutter pressed portion 23E are positioned within the fixed rail 11. However, the present disclosure is not limited to this.

In the above-described embodiment, even in the state where the first pressing portion 122C is in contact with the first shutter pressed portion 22F, the gap is present between the front end of the second shutter 23 and the end wall 22D of the first shutter 22. However, the present disclosure is not limited to this. For example, the front end and the end wall 22D may contact with each other with substantially no contact surface pressure therebetween.

The sliding device 10 of the above-described embodiment comprises the first shutter 22 and the second shutter 23. However, the present disclosure is not limited to this. For example, the sliding device 10 may comprise either one of the first shutter 22 and the second shutter 23.

The sliding device 10 of the above-described embodiment comprises the screw rod 131 and the nut 132A, and is a motorized type in which the nut 132A is rotationally driven. However, the present disclosure is not limited to this.

For example, the sliding device 10 may be (a) a manual sliding device not including the screw rod 131 and the nut 132A, (b) a sliding device in which the screw rod 131 is rotationally driven, (c) a sliding device in which the nut 132A is provided to the fixed rail 11 and the screw rod 131 is provided to the movable rail 12, or the like.

In the above-described embodiment, the engaging body 26 is provided to the first shutter 22, the engaged portion 29A is provided to the fixed rail 11, and the pressing portion 28 is provided to the movable rail 12 (the end cap 122).

However, the present disclosure is not limited to this. The present disclosure may have a configuration in which, for example, the engaging body 26 is provided to the fixed rail 11, the engaged portion 29A is provided to the first shutter 22, and the pressing portion 28 is provided to the first shutter 22.

In the sliding device 10 of the above-described embodiment, the engaging body 26 is two in number. However, the present disclosure is not limited to this. The present disclosure may have a configuration in which, for example, the engaging body 26 is one or three or more in number.

The resilient element 27 of the above-described embodiment is configured with the coil spring. However, the present disclosure is not limited to this. The present disclosure may have a configuration in which, for example, the resilient element 27 is configured with a torsion spring, a torsion bar, or the like.

The resilient element 27 of the above-described embodiment is coupled to substantially the center of the shaft member 26D connecting the two engaging bodies 26 to each other. However, the present disclosure is not limited to this. The present disclosure may have a configuration in which, for example, the resilient element 27 is coupled to a portion other than substantially the center of the shaft member 26D.

In the above-described embodiment, the first position is on the opposite side of the second position across the neutral line L1. However, the present disclosure is not limited to this. It is sufficient for the resilient element 27 to be able to produce the resilient force for at least maintaining the engaging body 26 in the engaged position.

The engaging body 26 of the above-described embodiment comprises the hook 26C surrounding the engaged portion 29A from the three directions in the engaged position. However, the present disclosure is not limited to this. It is sufficient for the engaging body 26 to achieve engagement enabling inhibition of sliding of the first shutter 22.

In the above-described embodiment, in the engaged position, the hook 26C and the engaged portion 29A are positioned below the rotational axis Lo. However, the present disclosure is not limited to this. The present disclosure may have a configuration in which, for example, the rotational axis Lo is substantially parallel to a vertical direction.

The engaged portion 29A of the above-described embodiment is provided to the stopper member 29 and fixed to the fixed rail 11 via the stopper member 29. However, the present disclosure is not limited to this. The present disclosure may have a configuration in which, for example, the engaged portion 29A is provided directly to the fixed rail 11.

The contact portion 22H of the above-described embodiment contacts with the retaining bracket 133 to thereby inhibit a backward movement of the first shutter 22. However, the present disclosure is not limited to this.

The engaging body 26 of the above-described embodiment is displaced rotationally (pivotally). However, the present disclosure is not limited to this. The present disclosure may have a configuration in which, for example, the engaging body 26 is displaced in a sliding manner.

In the above-described embodiments, the vehicle seat of the present disclosure is applied to an automobile. However, the present disclosure is not limited to this, and can also be applied to seats used in other vehicles, such as railroad vehicles, ships, and aircrafts, and to stationary seats used at theaters, homes, and other places.

Furthermore, the present disclosure is not limited to the above-described embodiments as long as it conforms to the gist of the invention recited in the appended claims. Thus, at least two of the above-described embodiments may be combined together, and any of the elements in the above-described embodiments may be omitted.

What is claimed is:

1. A sliding device configured to support a seat body of a vehicle seat in a slidable manner, the sliding device comprising:
    a fixed rail configured to be fixed to a vehicle, the fixed rail comprising an opening opened upward, the opening being arranged in a longitudinal direction of the fixed rail;
    a movable rail to which the seat body is configured to be fixed, the movable rail being slidable with respect to the fixed rail;
    a shutter configured to close the opening, the shutter being slidable with respect to the fixed rail by receiving a force from the movable rail;
    an engagement mechanism comprising a first portion and a second portion, the first portion being provided to either one of the shutter and the fixed rail, the second portion being provided to other of the shutter and the fixed rail, the first portion being displaceable between an engaged position, in which the first portion is engageable with the second portion, and a disengaged position, in which the first portion is displaced from the engaged position and disengaged from the second portion;
    a resilient element configured to produce a resilient force maintaining the first portion in the engaged position; and
    a pressing portion provided to the movable rail or the shutter, the pressing portion contacting with a pressed portion provided to the first portion when the movable rail slides, to thereby displace the first portion to the disengaged position,
    wherein the first portion is displaced rotationally about a rotational axis substantially perpendicular to a sliding direction of the movable rail.

2. The sliding device according to claim 1,
    wherein the first portion is provided to the shutter,
    the second portion is provided to the fixed rail, and
    the pressing portion is provided to the movable rail.

3. The sliding device according to claim 1,
wherein the resilient element is configured with a coil spring,
wherein a first end of the resilient element is coupled to the shutter,
wherein a second end of the resilient element is coupled to the first portion on an opposite side of the first end across a rotation center of the first portion, and
wherein, assuming that an imaginary line passing through the first end and the rotation center is a neutral line, that a position of the second end in the engaged position is a first position, and that a position of the second end in the disengaged position is a second position, the first position is on an opposite side of the second position across the neutral line.

4. The sliding device according to claim 3,
wherein the second portion has a columnar or cylindrical shape having a center axis substantially parallel to the rotational axis, and
wherein the first portion comprises a hook surrounding the second portion from three directions in the engaged position.

5. The sliding device according to claim 4,
wherein the rotational axis is substantially parallel to a width direction of the seat body, and
wherein, in the engaged position, the hook and the second portion are positioned below the rotational axis.

\* \* \* \* \*